United States Patent [19]

Molnar et al.

[11] Patent Number: 5,572,690

[45] Date of Patent: Nov. 5, 1996

[54] CASCADED MULTISTAGE COUNTERFLOW PIPELINE PROCESSOR FOR CARRYING DISTINCT DATA IN TWO OPPOSITE DIRECTIONS

[75] Inventors: Charles E. Molnar, Webster Groves, Mo.; Ivan E. Sutherland, Santa Monica, Calif.; Robert F. Sproull, Newton, Mass.; Ian W. Jones, Saratoga, Calif.

[73] Assignee: Sun Microsystems, Inc., Mountain View, Calif.

[21] Appl. No.: 468,884

[22] Filed: Jun. 6, 1995

Related U.S. Application Data

[63] Continuation of Ser. No. 140,654, Oct. 21, 1993, abandoned.

[51] Int. Cl.$^6$ ........................................ G06F 7/00
[52] U.S. Cl. .................. 395/376; 395/840; 364/231.8; 364/232.4; 364/232.22; 364/232.23
[58] Field of Search ........................ 395/375, 840

[56] References Cited

U.S. PATENT DOCUMENTS

| | | | |
|---|---|---|---|
| 3,166,715 | 1/1965 | Cogar . | |
| 4,112,489 | 9/1978 | Wood . | |
| 4,489,393 | 12/1984 | Kawahara et al. | 364/728.01 |
| 4,885,715 | 12/1989 | McCanny et al. | 364/728.01 |
| 4,991,078 | 2/1991 | Wilhelm et al. . | |
| 5,107,465 | 4/1992 | Fung et al. | 365/230.08 |
| 5,187,800 | 2/1993 | Sutherland | 395/800 |
| 5,210,750 | 5/1993 | Nassehi et al. | 370/85.2 |
| 5,361,367 | 11/1995 | Fijany et al. | 395/800 |

FOREIGN PATENT DOCUMENTS

| | | |
|---|---|---|
| 0365188 | 10/1989 | European Pat. Off. . |
| 57-139856 | 8/1982 | Japan . |

OTHER PUBLICATIONS

"Area–Efficient VLSI Computation" by Charles E. Leiserson, ACM Doctoral Dissertation Award 1982.

1992 International Conference on Computer Design, VSLI in Computers and Processors, Article entitled "Dynamic Reordering of High Latency Transactions Using a Modified Micropipeline", by A Liebchen et al., Oct. 11, 1992.

Article entitled "Modular Technique for Constructing Control Logic of a Pipelined Processor", IBM Technical Disclosure Bulletin, vol. 32, No. 7, Dec. 1989, New York, U.S., pp. 403–425.

Article entitled "Micropipelines", by Ivan E. Sutherland, Communications of the ACM, vol. 32, No. 6, Jun. 1989, pp. 720–738.

H. T. Kung, IEEE Publication 1982, pp. 300–309.

L. Hayst and M. Sandler "An Efficient Multidimensional/ Multidirectional Paralled Pipelined Architecture for Image Processing" Sep. 1991.

*Primary Examiner*—Krisna Lim
*Assistant Examiner*—Saleh Najjar
*Attorney, Agent, or Firm*—Philip J. McKay

[57] ABSTRACT

A counterflow computing pipeline including a series of similar stages is disclosed. In the basic form of the pipeline, the stages are arranged in a linear fashion and each stage in the pipeline communicates with its two adjacent stages. The flow of data elements in the pipeline is bi-directional. A first data stream of data elements flows in a first direction from stage to stage in the pipeline. A second data stream of data elements flows from stage to stage in the pipeline in a second direction counter to the first direction. Circuitry at each stage is provided so that every data element flowing in the first direction meets each and every data element that it passes flowing in the second direction. According to various embodiments of the invention, when two data elements meet at a stage, circuitry may be provided to compare the data elements, copy data from one data element to the other, or otherwise, cause the data elements to interact. The counterflow pipeline may be either synchronous or asynchronous, and may be used for a variety of applications in signal processing, associative memory, and computer architectures.

39 Claims, 17 Drawing Sheets

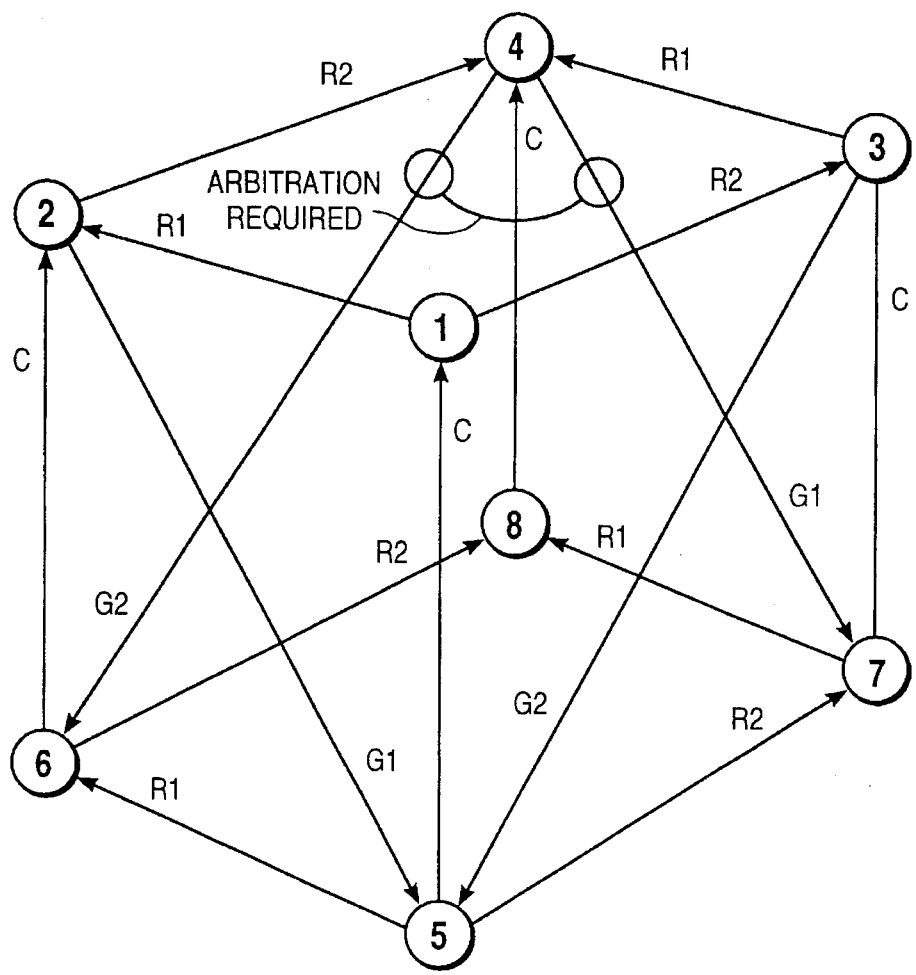
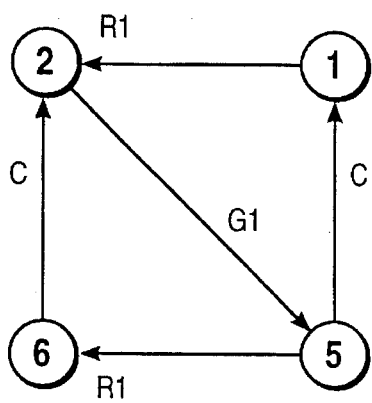
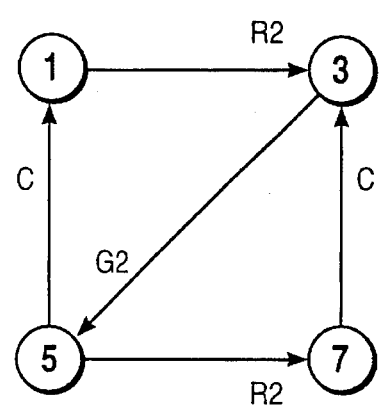
VIEW ALONG R2 AXIS
VIEW ALONG R1 AXIS
FIG. 6
STATE DIAGRAM

FIG. 12 COP INTERFACE

FIG. 13  IT INTERFACE

CASCADED MULTISTAGE COUNTERFLOW PIPELINE PROCESSOR FOR CARRYING DISTINCT DATA IN TWO OPPOSITE DIRECTIONS

This is a continuation of application Ser. No. 08/140,654, filed Oct. 21, 1993, now abandoned.

BACKGROUND OF THE INVENTION

Computing pipelines have long been used in signal processing, general purpose computing devices and other digital computing applications. In a computing pipeline, information flows from one stage to another, primarily in one direction through the pipeline, and is processed in various ways at the various stages of the pipeline.

One early application of computing pipelines is for rendering computer graphic images. In this kind of pipeline, data representing the image is passed from the computer memory through a series of processing stages and ultimately appears on the computer display. Another kind of computing pipeline is commonly used for multiplication. Here the many additions of which the multiplication is composed are arranged as the stages of a pipeline. As a multiplicand passes through the pipeline, partial products are accumulated in each stage such that at the end of the pipeline a complete product has been formed. In these uses of pipelines in computers, data elements flow in only a single direction.

Reduced Instruction Set Computer (RISC) processors also use an internal pipeline to execute instructions. At the first stage of the pipeline, instructions are fetched from instruction memory. At subsequent stages they are variously decoded, executed, and their answers recorded. In such pipelines it is common to have "bypass" connections that connect the outputs of subsequent stages to auxiliary inputs of previous stages so that data calculated by earlier instructions may pass as soon as possible to later ones. Without bypass paths, all calculated data would have to be recorded in a register file before being accessible to subsequent instructions.

In such RISC processors, a multiplicity of bypass paths creates a major design problem. Because bypass is required from nearly every stage to nearly every previous stage, each stage has many inputs. Designing the control system for such a RISC computer is rendered difficult by the need to manage data flow on so many data paths. Because each stage must choose whether to take its input from its predecessor stage or from any of a number of bypass paths, the design of even a single stage becomes very complex.

Most computing devices in use today are synchronous and use an externally provided clock signal to step through its sequence of operations. Each action takes place only after arrival of the next clock event and all parts will act, if at all, at precisely the same intervals.

In asynchronous circuits each individual part acts independently whenever local conditions permits it to do so. Local logic detects when conditions are right and initiates the appropriate action. Each stage in an asynchronous pipeline sends data forward to the next stage without reference to any external clocking signal whenever the two stages agree that such a transaction is proper.

A bypass path structure in synchronous systems is undesirable for two reasons. First, as integrated circuits get larger, the delay in a long bypass path may become excessive and require a slower clock rate. Second, in a large integrated circuit, it is difficult to deliver identical clock signals to all parts of the pipeline. Differences in the timing of clock signals to different parts of the pipeline are called "clock skew". It may be difficult or impossible to accept data coming from a source remotely located in the pipeline whose clock is skewed with respect to nearby clock signals.

In an asynchronous system, bypass paths are very difficult to implement because remote sections of an asynchronous system operate at times entirely independent of the operation time of local information. Great care must be taken when moving data between widely separated stages in an asynchronous system. Failure to exercise adequate design care may permit occasional data elements to be damaged or lost and thus render the system unreliable. The difficulty of this task accounts in part for the very infrequent current use of asynchronous systems.

Finally, the presence of bypass structures requires careful control of when data actually move in the pipeline. In most systems in use today, if any stage is unable to move its data, it informs all other stages of its stall and they all wait. Because the stall signal may originate in any or all stages and must be delivered to all stages, it involves not only a logic function with many input terms, but also a lengthy of communication path, both contributors to delay. Thus the stall signal itself may be a pacing item in the system.

Asynchronous pipelines are rare largely because designers have considered them too difficult to design. Some asynchronous pipelines are now used in First In First Out buffer memories, mainly in signal processing and input/output applications. A particularly simple form of asynchronous pipeline was described by Sutherland in U.S. Pat. Nos. 5,187,800, and 4,837,740 and in the publication called Micropipelines. In the asynchronous pipeline devices that have heretofore been built, information flows in only a single direction, or if information is to flow in more than one direction, entirely separate mechanisms are used for the separate directions. Such structures are merely compound use of the one directional pipeline.

The design of a RISC computer with many bypass paths in the asynchronous design style has heretofore proven beyond the capability of designers. The few asynchronous RISC's that have heretofore been designed (Caltech, Manchester) have avoided bypass paths and thus suffered unnecessary delay and performance degradation.

ELASTIC VS INELASTIC

Pipeline systems can be either "elastic" or "inelastic". In an elastic pipeline, gaps in the stream of data flowing through the pipeline may form or vanish as required, whereas in an inelastic pipeline, gaps in the regular data stream, called "bubbles", remain in position. Elastic pipelines are more flexible than inelastic ones. For example, should one stage of an elastic pipeline require longer than usual to act on a particular data element, other data elements that have already passed through the delaying stage are free to move forward without restriction, even though by so doing they introduce a gap into the data stream. Differences in the processing time of various stages can thus be smoothed out by buffers of various kinds. Importantly, however, an elastic pipeline permits deletion of existing data elements and insertion of new ones interior to the pipeline. In an elastic pipeline, deletion of a particular data element simply leaves a gap that can be filled by subsequent data elements. Similarly, by delaying transfer of subsequent elements in the pipeline, an elastic pipeline can insert new data elements at will. These insertion and deletion operations have been used in graphics pipelines where a part of the computation may determine that a particular part of the stored data does not appear on the screen and therefore should be removed from the data stream, or that the present viewpoint is so close to a particular part of the object viewed that it should be displayed in greater detail.

In some systems, a part of the benefit of an elastic pipeline is obtained in an otherwise inelastic system by "bubbles". In such an inelastic system, the stream of data elements are spaced at regular intervals. Were one of the data elements to be deleted, the regular spacing would be destroyed. Instead of merely deleting the data element, it is replaced instead by a blank, or bubble. The bubble holds the position of a data element, but does not enter into the computation. By introducing bubbles, an inelastic pipeline can handle deletion, though it can gain no speed advantage from closing up the gap thus created. Inelastic pipelines cannot insert new data into the stream except by replacing an existing bubble. If no bubble happens to be available, new data cannot be inserted at all.

APPLICATIONS FOR PIPELINES

There are many applications where it is desirable to compare all elements from two streams of data. In many applications it is important that each and every data element flowing in one direction interact with each and every data element flowing in the other direction. The function of such applications might be destroyed were two counterflowing data elements to pass without interaction. For example, in a word search application, it is important that each and every word in the text being searched actually be tested against each and every search word. The term "countersynchronized comparison" is used herein to mean that interaction occurs between elements passing in opposite directions once and only once in some stage of the pipeline.

One form of comparison circuit is used in search engines applied to searching text for particular key words. In such a system, each key word is stored in a fixed stage in the system and the text to be searched streams past them through a one-directional pipeline. At each stage in the pipeline the word stored is compared to the word passing through, and any match is reported.

Such one directional computing pipelines can compare a relatively fixed set of data to a relatively mobile set. At each step as many comparisons are done as there are stages in the computing pipeline, and each element from the moving set visits each member of the fixed set in turn.

Because the moving data elements visit each stage of the pipeline in turn, each need be sent to only one place at a time, and that place is in close proximity to the source of the data element, namely the previous stage of the computing pipeline. Thus computing pipelines have high throughput and require less electrical power than alternative comparison circuits such as associative memories.

The number of stages in a one-directional computing pipeline limits the number of data elements that can be in the fixed data set. Typically, there is one cell or one stage for each element of the fixed data set, and it is relatively harder to change an element of the fixed set than to enter a new element from the moving set for comparison.

Systolic arrays have also been described in the past. In a systolic array computing device, an array of similar stages communicate with nearest neighbors in such a way as to perform some complex computing operation. In a systolic array, as generally understood in the art, the communication between neighboring elements occurs on a regular schedule. The computing operations at each stage must fit into this schedule of data transfer.

Pipeline connections have also been used in communication systems. Seitz, for example, describes a system in which messages are passed from one stage to another in a network in order to go from a particular source to a particular destination. Although messages in Seitz's system may travel in both directions, the data elements in the two flows are entirely independent. There is no interaction between messages flowing in one direction and those flowing in the other.

SUMMARY OF THE INVENTION

The present invention provides a two-directional pipeline that is able to control data flow in both directions and allow counterflowing data elements to interact reliably at each stage of the pipeline.

The present invention provides for an irregular flow of data in a reverse direction along regular paths to simplify greatly the delivery of data from subsequent stages to earlier ones. The present invention permits data to move on an irregular schedule depending on the data to be passed, the particular stage through which it is passed, and the operations that are to be performed on it. The present invention treats two sets of data in a symmetric fashion and can form a very simple and regular structure for a RISC computer. Each stage in the pipeline communicates principally only with the stage ahead and behind itself. Data elements may pass through several stages before being used. By replacing the complex set of bypass paths commonly found in RISC computers with a single return path, the present invention gains valuable design simplicity. The delay of transmitting data over several stages instead of through a direct bypass path is minimal because of the high speed possible in the simple design.

The present invention includes novel synchronous and asynchronous embodiments. Synchronous pipelines today usually operate by means of a handshake protocol between stages. In such a handshake protocol, the receiver indicates to the sender that space is available to accommodate a new data element. If a data element is available, the sender indicates to the receiver that it should be taken. Thus in the handshake protocols now in use, the sender alone decides when data should be transferred. This approach accommodates "bubbles", i.e., empty places in the otherwise smooth flow of data. The present invention includes a symmetric form of communication in which adjacent stages mutually and symmetrically decide when data may move from one stage to the next.

The asynchronous embodiment for a counterflow computing pipeline disclosed herein is unique in its ability to pass information asynchronously and concurrently in two directions.

The present invention describes a simple symmetric mechanism for providing countersynchronized comparison between two counterflowing streams of data. The symmetry and simplicity of the mechanism make it easy to implement and provides a rich opportunity to attach particular computation devices to accomplish a wide variety of tasks. Special circuits are included to provide countersynchronized comparison. The countersynchronized comparison of the counterflow pipeline makes it most useful to provide several advantages.

The present invention avoids the need for a global stall signal. Each stage is self-contained and need communicate only with adjacent stages. Because only local communication is required, long connections and the delay and power consumption they bring are avoided. If a stage needs more time to operate, it informs only its adjacent stages so that they may behave properly.

This use of local control also makes the present invention ideal for use in asynchronous systems. Each stage in an asynchronous system can proceed at its own pace, informing its adjacent stages when it is ready to accept or deliver data. No global clock is required, but more important, no global control signal is required. The stall signal commonly found in synchronous systems with bypass paths is avoided.

The present invention provides for a pipeline that is both bi-directional and elastic. Heretofore, elastic pipelines had been described for flow in only a single direction. The present invention exploits the elastic property of its pipeline by permitting flow in either direction along the pipeline without interaction if a gap in the data flow in the other direction renders interaction unnecessary.

BRIEF DESCRIPTION OF THE DRAWINGS

FIG. 6 is a state diagram for the ARBITER that is used in the COP showing its 8 states.

DETAILED DESCRIPTION OF THE INVENTION

OVERVIEW

Figure 1A:
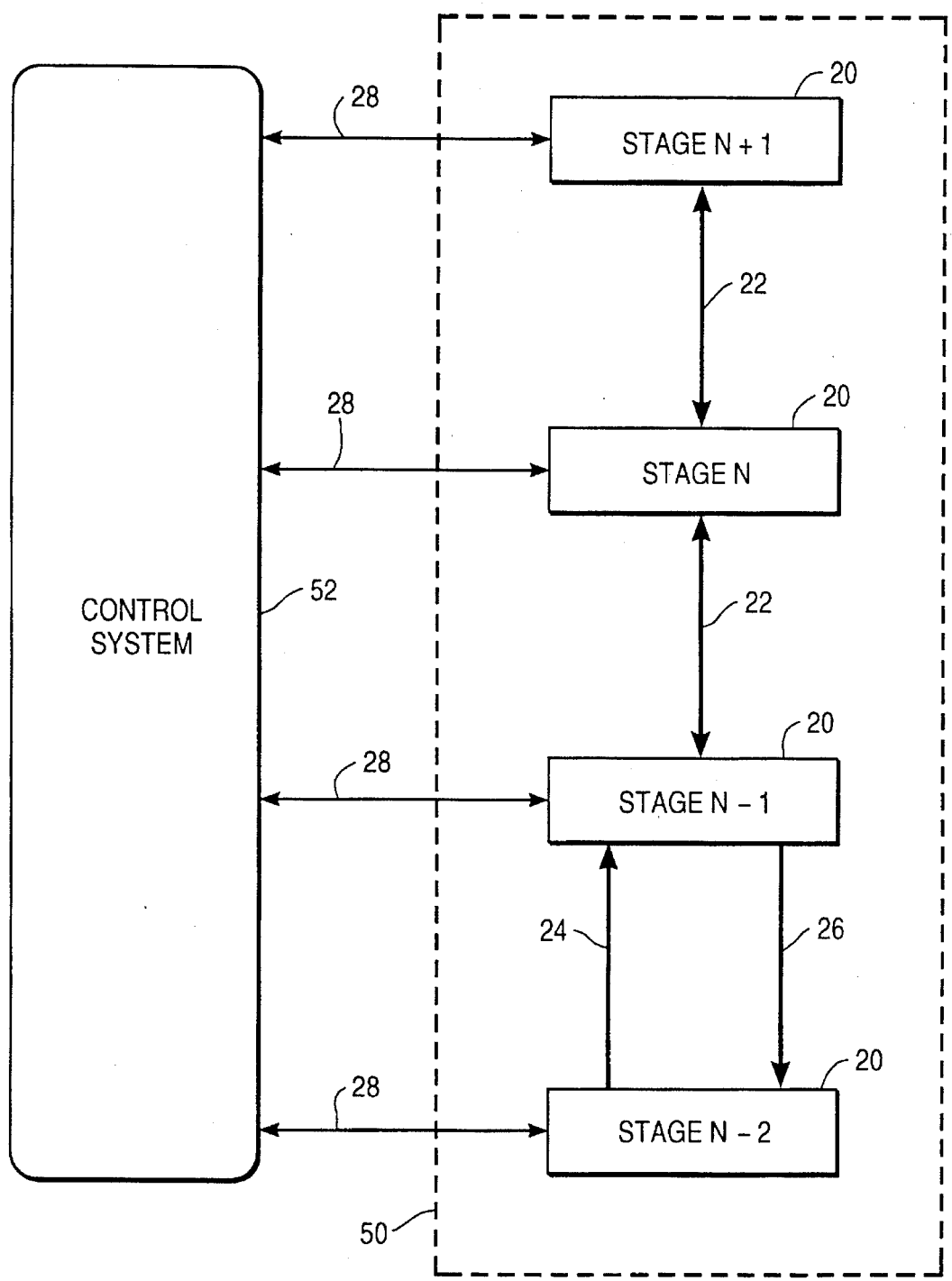
FIG. 1A is a block diagram of a counterflow pipeline control operating a set of data path stages.

The present invention includes a counterflow pipeline, consisting of a series of stages in a linear progression. For the purpose of this description, stages are described as if they were placed one above the other so that the linear progression is thought of as vertical. Of course, as in all electronic systems, the actual placement of the stages in space is irrelevant to their correct operation so long as logically adjacent stages lie in reasonable proximity.

Each stage in the pipeline may communicate in either direction with its two immediate neighbors. Because communication is bi-directional, information may flow both up and down along the set of stages.

The counterflow pipeline is capable of concurrently streaming one set of data elements up through the pipeline and another set of data elements down through the pipeline. The upward and downward streaming operations may be independent; all or part of either data stream may move or remain stationary as is required by the mechanisms that deliver data to it at its beginning and accept data from it at its terminus. There may be gaps in either or both of the data streams because the control mechanism may make the pipeline "elastic" in both directions.

The actual communication between stages may be accommodated by any convenient mechanism. In most cases it will be through a suitable set of wires, one for each data bit to be communicated. Alternately, communication between stages might be in serial form, one bit at a time, or multiple bits at a time, taking multiple steps to pass the entire data element. Similarly, communication might be by electrical, optical, acoustical or any other suitable means.

Each stage of the counterflow pipeline contains at least two memory elements, e.g., registers, one for data elements flowing up, and the other for data elements flowing down. Of course either or both of these registers might at any time be empty if there were a gap in the regular flow of data in that direction. Only if data are provided in both directions will both of these registers contain a data element.

The data elements in the two streams may differ in size or function. The meaning of the bits in the two streams may likewise be similar or quite different. The registers for the upward flow may accommodate as many bits of data as the register for the downward flow, or more bits, or fewer bits. In most useful systems, the number of bits in the two registers in each stage will be different. Moreover, different parts of the pipeline may have registers that hold more or fewer bits as required to suit the needs of the data elements at that stage of processing. The upward flow may be "wider" or "narrower" at different places than the downward flow, referring to the number of bits in each data element in the stream.

There are four possible states of occupancy of the registers. If neither register contains a data element, the stage is said to be "empty" (E). If both registers contain a data element, the stage is said to be "full" (F). If only one register contains a data element, the stage is either "half full" or "half empty" depending on the optimism of the speaker. The state of the stage when half full or half empty may be named by the data element that is present. For example, the state will be said to be "up" (U) if only the register associated with the upward stream contains a data element or "down" (D) if only the register associated with the downward stream contains a data element. Thus the stage may be said to be in state "E", "F", "U", or "D".

The communication circuits between stages serve to pass data in two directions: 1) up, from the upward register in one stage to the upward register in the next stage, and 2) down, from the downward register in one stage to the downward register in the previous stage. The registers and the communication circuits together provide a path through which data elements of the two streams may flow from one end of the pipeline to the other. The upward data stream flows into the bottom stage of the pipeline and out of the top, and the downward data stream flows into the top stage of the pipeline and out of the bottom.

The control circuits for both streams can be symmetric. The control circuits for the upward stream are symmetric to the control circuits for the downward stream around the obvious reversal of roles of the stages above and below the stage being controlled. Other than their labels, no distinction need be made in the control circuits as to which controls the upward stream and which controls the downward stream.

Although the size, meaning, and processing taking place on the two streams may differ, both streams are mobile and may be similarly controlled. Unlike the associative memory or the ordinary pipeline processors now in use that provide for one mobile and one relatively fixed set of data, the counterflow computing pipeline provides for the interaction of two similarly mobile streams of data.

Each stage of the counterflow pipeline may contain a comparison circuit if desired. If both data elements are present, state (F), such a comparison circuit can compare all or some pan of a data element from the upward flow with all or some part of a data element from the downward flow. If either or both of the data elements are missing, the comparison circuit will remain idle. It is generally useful for such comparison circuits to compare only a part of the data elements, often called the "tag" or "address" pan of the data elements. Other pans of the data elements may be processed in various ways depending on the results of the comparison. In most uses every stage will contain a comparison circuit so that the property of "countersynchronized comparison" may be obtained.

Although the word "match" is used herein to indicate a successful comparison, it is to be understood that the comparison might take many forms. Although the word "match" may seem to imply that the comparison seeks bit by bit identity in the two parts of the data elements tested, bit by bit matching is merely the simplest form of comparison and provides the simplest key word to use for describing when data processing between the two data streams should take place. Alternatively, in more complex systems a "match" might occur when all or some pan of a data element from the forward stream is greater than, in the arithmetic sense, all or some part of a data element from the reverse stream. Any of the arithmetic operations might be used, e.g., greater than, less than, zero, out of range, and so forth. Logical operations of any kind might also be used, including both the ordinary ones like comparison under a mask, and exotic ones like declaring a match if the count of true binary bits in one data element exceeds the count of true binary bits in the other. In general, matching tests for a specific relation between an element in one and an element in the other. Those skilled in the art will quickly expand the range of conditions that might be called a "match" and thus invoke further processing.

Typically the purpose of comparing a data element in the upward stream with one in the downward stream is to determine if some action depending on or affecting one of both of them is required or permitted. The specific action may be dependent upon particular bit patterns present in one or both of the data elements, or upon the occurrence of particular relationships between bit patterns in the two elements. If some action is required as a result of such a comparison, it is called a "match."

When a "match" is found as a result of a comparison within a counterflow computing pipeline stage, the stage may modify the data in either or both of the data streams. Many types of modification are possible; the particular form of modification is not restricted by the present invention, because the present invention encompasses all such modifications or no modification at all. The particular form of modification will be designed to suit the needs of the processing task at hand.

One simple form of modification to do when there is a match is to put into the true state one binary tag bit in one or in each of the data elements. When the data elements so marked reach the terminus of their trip through the counterflow processing pipeline, they may be selected for special processing. Another simple form of modification to do when a match occurs is to copy a designated part of one data element into a designated part of the other data element. Such a copying operation can cause selected information to move from one data stream into the other. Another form of modification to do is to mark one of the data elements invalid when a match occurs so that further stages of the pipeline may ignore it or delete it from the data stream. Other forms of modification to do when there is a match may involve arithmetic or logical operations on the data elements from the two streams. It will be apparent to those skilled in the art that a wide variety of operations are possible on all or parts of two data elements.

It is also contemplated that any stage of the counterflow computing pipeline may do ordinary digital processing on a data element from one or the other or both of the data streams without reference to a data element from the other stream. The form of computation in one stage may or may not bear any resemblance to the kind of computation done in another stage; the stages need not be the same in this regard. For example, a particular stage might add together two parts of each data element from the forward stream and record their sum as a part of that same data element. Such an operation need not depend on the presence of a data element from the other stream, and is thus similar to the processing now commonly done in computing pipelines. There may be special operations that must be done on the elements of one stream that are irrelevant to the elements of the other stream.

Some data processing operations will be done only when there is a "match". Such operations may involve arithmetic calculations on the values of the two data elements that were matched. They may also involve substitution of data from one data element into the other. Alternatively, they may involve validating or invalidating data in one or the other data element by changing the state of suitable validation marker bits. Those skilled in the art will appreciate that a very wide range of possible data processing operations is possible and may be desirable for different tasks.

A very useful feature of the present invention is that it is able to guarantee complete and non-redundant comparison. "Complete Comparison" means that if a particular data element from the upward stream passes a data element from the downward stream, the two will concurrently occupy at least one stage of the counterflow computing pipeline and a comparison will take place. Two such data elements cannot pass each other without meeting in some stage. When both occupy the same stage of the counterflow computing pipeline it will be "full" (F), and the two elements can be compared. Thus the complete comparison property guarantees that every element from one stream will be compared at least once to each element of the other stream past which it flows.

"Non-redundant comparison" means that each data element from the forward stream is compared with each data element of the reverse stream at most once. The counterflow computing pipeline described herein is able to guarantee that each data element from one stream that has already met a data element from the other stream will never meet it again.

Together, the complete and non-redundant properties of the counterflow computing pipeline are able to guarantee that each data element from one stream will meet each data element from the other stream exactly once. The complete and non-redundant property of the counterflow computing pipeline described here ("Countersynchronized Comparison") makes it useful for a variety of computing tasks.

The control circuitry provided in the counterflow pipeline to ensure comparison distinguishes the counterflow pipeline from two separate pipelines that happen to flow in opposite directions. In the case of two separate pipelines flowing parallel to each other but in opposite directions, a data element flowing up might pass a data element flowing down without ever occupying the same stage with it. This could happen if the two data elements occupy adjacent stages, and then at a single moment in time exchange places. The two, although they have passed each other, have never actually been able to interact. The counterflow pipeline includes particular circuitry to prevent this occurrence.

An extension to the invention is described here that makes it possible to delete unneeded data elements from either or both of the two data streams. Deletion is useful where comparison between elements of the two data streams renders a data element from one or the other of them obsolete. Although deletion will work in both the synchronous or the asynchronous embodiment of the invention, in the synchronous embodiment it may introduce a "bubble".

Another extension to the invention is described here that makes it possible to insert new data elements into either or both of the two data streams. Insertion of new data elements into one or the other stream is useful where the computation on the present data elements produces new data elements that require further processing. It has been found useful in some applications to insert data elements into the downward stream in response to and as a result of computations that take place on data elements in the upward stream. Because the basic pipeline is symmetric, of course, it is equally possible to insert data elements into the upward stream in response to events that occur in the downward stream.

The counterflow pipeline described here can be formed into branching structures. The simplest form of branching structure is a simple bifurcation. Below the bifurcation there is only a single counterflow pipeline. Above the bifurcation there are two separate counterflow pipelines, called the right pipeline and the left pipeline. The system looks like the letter Y. Those skilled in the art will recognize that because of the symmetry of the counterflow pipeline a description of such a simple bifurcation suffices to render possible any branching or joining structure. A structure with two pipelines below and a single one above is just the "Y" structure turned upside down. Those skilled in the art will recognize that multi-way branches and junctions involving more than two branches are possible.

Data flowing up from below the bifurcation may be sent either to the left or to the right or both depending on some rule of bifurcation. Such a rule might use some distinguishing characteristic of the data elements themselves to direct them. For example, elements representing English words might be sent into one pipeline and elements representing French words might be sent into the other. Other rules are also possible including alternate use of the two output pipes, random choice, choice on the basis of which output pipeline is less busy, or by sending part of each element up each pipe.

The downward flowing streams meet at the bifurcation. Again a choice must be made as to how to fit the elements of these two streams into a single stream. A variety of rules is possible including alternate service, service on the basis of first arrival, service on the basis of data content, combining elements in pairs, conjoining data from each or others as will be obvious to those skilled in the art. Any particular bifurcation can be characterized by the rule it uses for dividing the upward flow and the rule it uses for combining the downward flow.

In most pipelines it is convenient to think of each stage as having a single register for upward bound data and another for downward bound data. It is also possible, however, for a single stage of the pipeline to have more than one register for data traveling in one or the other direction or both Such a system must be capable of multiple comparisons so that each of the several upward bound data values present in the stage may properly be compared with each of the downward bound values.

Particular stages of the pipeline may accept signals from outside the pipeline. Such signals may deliver special data to the pipeline such as the time of day, or modify the actions of the pipeline. For example, a particular stage might wait for some external event before undertaking a particular computation or passing on a particular piece of data. It is particularly useful to use such a mechanism to accept data from an external memory system.

Similarly, particular stages of the pipeline may deliver signals to external devices. Thus a particular stage of the pipeline might control some physical device such as a light bulb or buzzer to alert an operator to a particular condition. It is particularly useful to use such a mechanism to deliver data and addresses to an external memory system.

It is possible to construe such external attachments to the pipeline as pipeline bifurcation with one side of very limited capability. It is often simpler, however, to think of each such attachment as a special case. Those skilled in the art will recognize that the control system described here can be adapted to control a wide range of such external devices.

An external device may be connected to several stages of the pipeline. For example, a memory device might receive instructions from one stage of the pipeline and deliver answers to another stage. Such a connection is referred to herein as a "siding" because of its similarity to a railroad siding on the main line.

Sidings are useful wherever an external process will take longer than the time it takes to move data from one stage to the next in the main pipeline. A siding can do its task while data are moving along the main pipeline, and deliver its answer at the appropriate point in the pipeline to match the needs of the advancing data. For example, a memory siding will look up the required value in an external memory while the data element that needs the memory value moves along the main pipeline. Similarly, an arithmetic siding can compute some difficult arithmetic function, e.g. division, while other operations are done in the main pipeline. Such memory and arithmetic sidings provide a facility to match the relatively high speed of a counterflow pipeline to the lower speed of many useful computing operations.

SYNCHRONOUS AND ASYNCHRONOUS METHODS

The present invention encompasses both synchronous and asynchronous embodiments for counterflow computing pipelines. In a synchronous embodiment, data moves from one stage of the pipeline to the next, if at all, only upon the next arrival of an external timing signal called a "clock". In a synchronous embodiment data remains stationary between clock signals. In a synchronous embodiment, data will also remain stationary if there is no space to accommodate it in its next destination. In a synchronous embodiment the sending and receiving stages agree on which clock events to use for passing data up or down as the case may be.

In an asynchronous embodiment of a counterflow computing pipeline data moves between stages whenever the sending and receiving stages agree that it should so move, independent of any external clock signal. In an asynchronous embodiment, each data element from the forward stream is free to move forward as soon as there is space for it in the next stage, it is no longer needed in this stage, and as quickly as the local circuitry permits. Each data element from the reverse stream is free to move backward as soon as there is space for it in the previous stage and as quickly as the local circuitry permits.

A highly useful aspect of the present invention is its ability to provide the complete and non-redundant comparison property called "countersynchronized comparison" in conjunction with asynchronous or unclocked local control of data motion.

DESCRIPTION OF PREFERRED EMBODIMENT

Figure 1B:
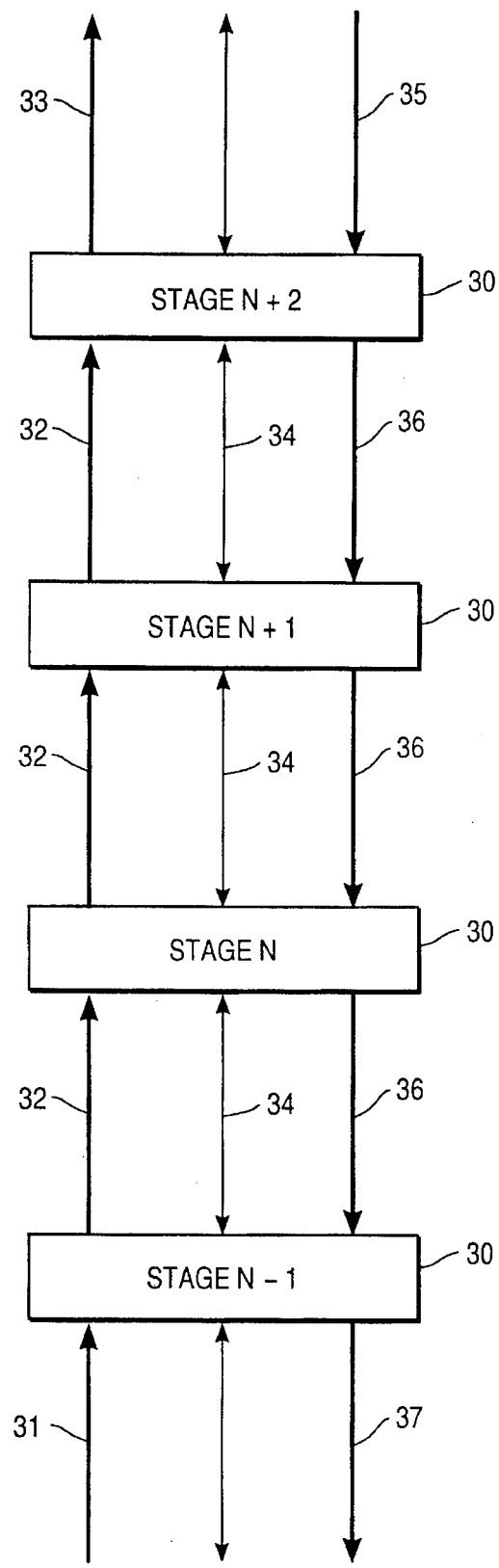
FIG. 1B is a block diagram of a counterflow pipeline showing the stages, the upward and downward data flow paths, and control communications paths between stages.
Figure 1C:
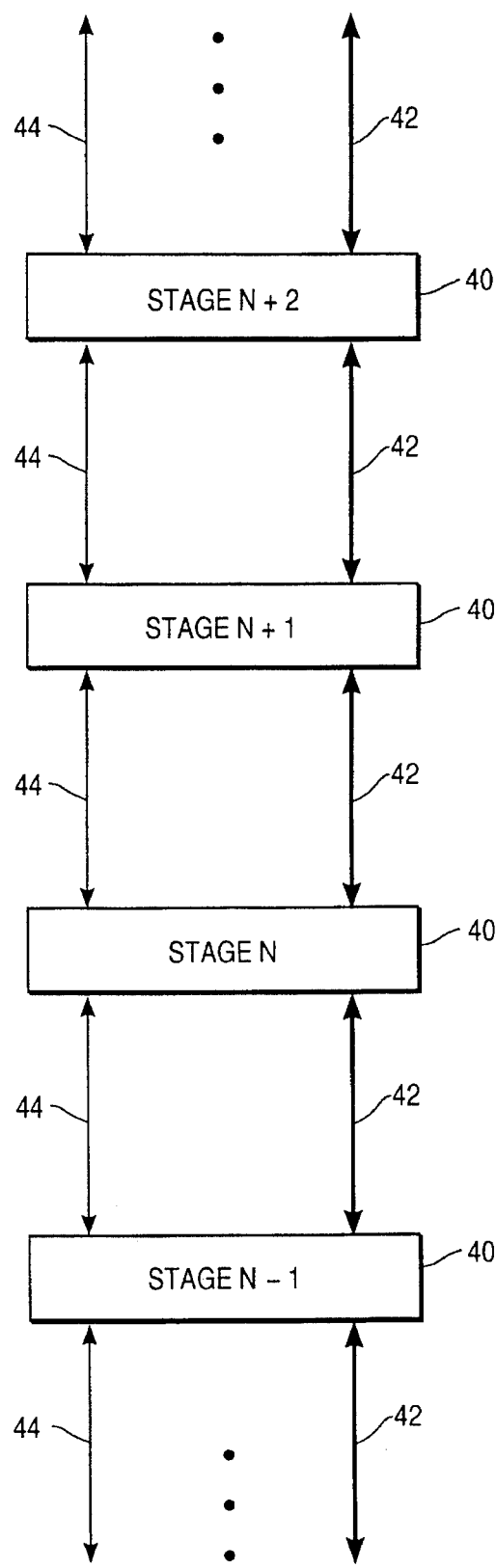
FIG. 1C is a block diagram of a counterflow pipeline using bi-directional data paths.

In FIG. 1A, 1B and 1C, stages 20, 30 or 40, are arranged one above the other, with data flowing "up" or "down" through the pipeline thus formed. The words "up" and "down" in this context, refer only to the directions in the drawing and bear only coincidental resemblance to the actual directions of flow in a real system. Throughout this description of the invention, "up" and "down" are used merely to provide a useful distinction for the two directions of data flow.

The present invention provides the control mechanism for a set of similar stages that communicate in two directions to provide for forward and reverse data flow. The block diagram of the most general form of the present invention is shown in FIG. 1A. As illustrated in FIG. 1 A, there are several stages 20 of a data pipeline, 50, labeled STAGE N, STAGE N–1, STAGE N+1 and so forth. These data stages communicate in two directions by means of data paths 22, 24, and 26. In some cases the up and down communication may be on separate paths such as 24 and 26, or on a single path used reversibly as illustrated by 22, or combinations of these arrangements.

The control system 52 for these stages interacts with them by means of control signals in control paths 28 connecting the control system and the stages. Some control signals flow from the control to the stages and serve to control the actions of the stages. Other control signals flow from the stages to the control system to indicate the state of the stages or information about their data content.

It must be recognized that the arrangement of FIG. 1A is intended for illustrative purposes only. Some of the data paths shown in FIG. 1A might be missing, some might carry more information than others, and special data paths not shown might be included. The present invention contemplates many such variations as will be obvious to those skilled in the art.

The control system 52 provides for orderly flow of data through the stages. Data elements may flow in both directions between the stages, and may flow at separate times, or concurrently between different stages.

The control system 52 provides for countersynchronized comparison of the data flowing in one direction through the data path with data flowing in the other direction.

In another form of the invention, the control system is distributed into the stages themselves. As illustrated in FIG. 1B, the pipeline may comprise a set of similar stages 30 with data paths 32 and 36, illustrated with broad arrows, and control paths 34, illustrated with narrow arrows, flowing between them. In FIG. 1B, separate data paths are illustrated for the up and down directions of data flow. In FIG. 1C, a common data path 42 is used for both directions of data flow. As illustrated in FIG. 1A, 1B and 1C, there are several stages of the pipeline identified as 20, 30 or 40 and labeled STAGE N, STAGE N–1, STAGE N+1 and so forth.

As illustrated in FIG. 1B, the stages communicate in the upward direction by means of data path 32 and in the downward direction by means of data path 36. The data paths are drawn as double arrows to indicate that they may carry many data bits in parallel. Data elements for the upward stream enter it at the bottom input port 31 and depart from the top exit port 33. Data elements for the downward stream enter it at the top input port 35 and depart from the bottom exit port 37.

Parallel to and in addition to the data communication paths shown in FIG. 1B, there are also control paths 34. These paths are indicated by a narrow double headed arrow to indicate that control signals may flow in each direction to control the actions of the stages. The double arrow is intended to indicate that control signals may flow on separate paths both up and down. The control paths indicate to the control system in each stage information about adjacent stages so that each control can provide for orderly flow of information in the data communication paths.

It will later be seen that in some implementations it is possible for the upward and downward data movements to use the same data path, because they must occur at different times. It may in some cases be desirable to use the same data path 42 for communication in both the up and down directions, as shown in FIG. 1C. Here a single bi-directional data path 42 is used for both the upward and downward flowing data elements. A control path 44 communicates control information between stages.

Figure 2A:
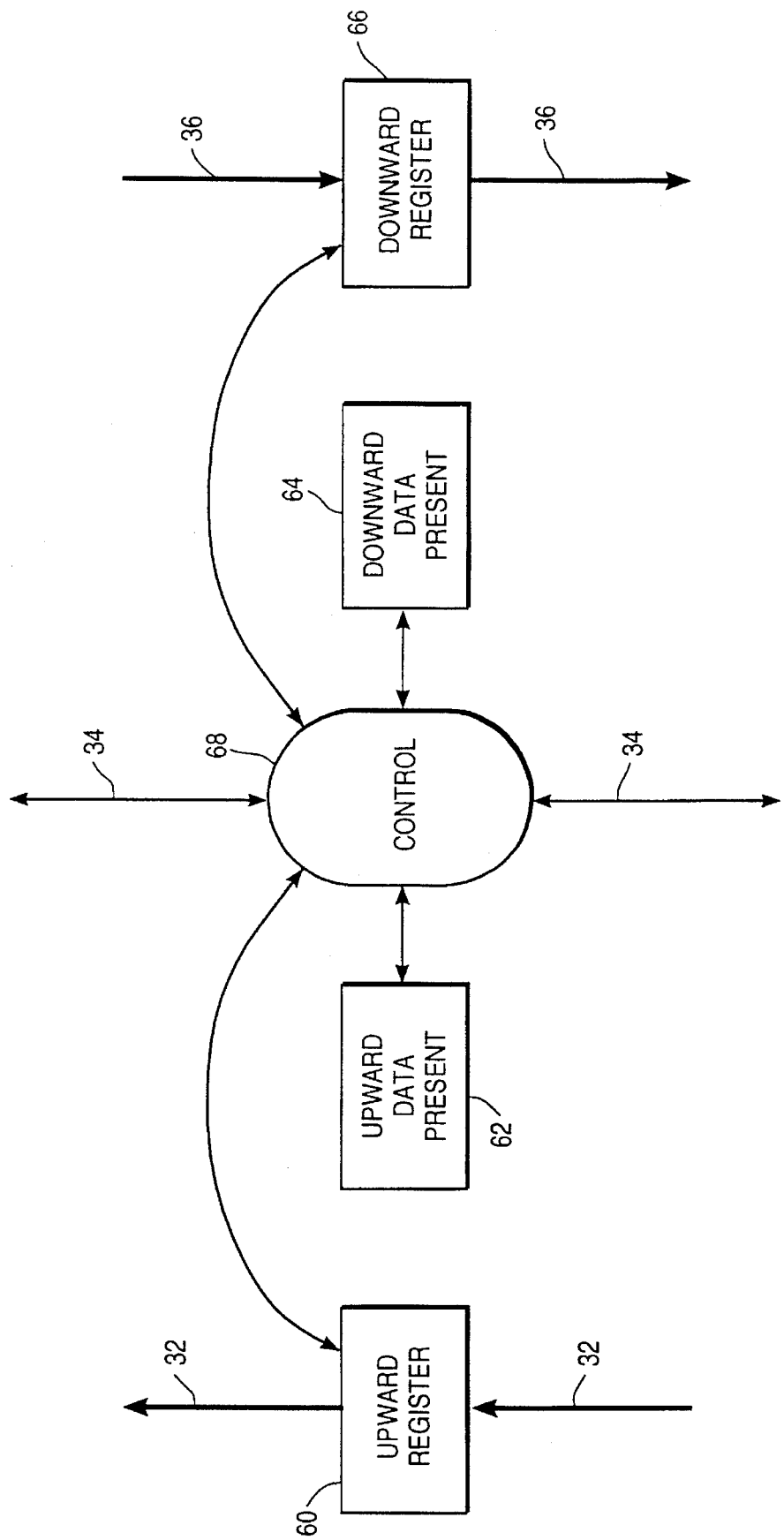
FIG. 2A is a block diagram of the register and control means within a single stage of a simple counterflow pipeline including marker flip flops to show the state of the registers.

The components of a single stage of the counterflow computing pipeline are shown in FIG. 2A. Each stage comprises at least a memory element, e.g., register 60 to accommodate a data element from the upward data stream and a second register 66 to accommodate a data element from the downward data stream. The registers 60 and 66 are attached to data communication paths 32 and 36, respectively, that connect each stage to its adjacent neighboring stages. Data elements flow from the registers in one stage to the registers in the adjacent stage along these communications paths. As suggested by the difference in size of registers 60 and 66, the two registers need not hold the same amount of information nor the same number of bits.

Each of the registers in a single stage may contain a data element or be empty. In the embodiment contemplated in FIG. 2A, a marker flip flop 62 and 64 for each of the registers is used to indicate whether it is full or empty. If it is set to one or zero, marker flip flop 62 indicates that a data element is present or absent respectively in the upward register 60. If it is set to one or zero, marker flip flop 64 indicates that a data element is present or absent respectively in downward register 66.

The state of these two marker flip flops indicate jointly four distinct states for the stage, "full" (F) and "empty" (E) being the two easiest to name, indicated by both marker bits set to one or both to zero respectively. The other two states occur when only a single data element is present, i.e., the stage is "half full", and are named (D) and (U) according to whether a downward moving data element or an upward moving data element is present, respectively.

In some embodiments of the counterflow computing pipeline, the empty and full states of the registers 60 and 66 may be determined by mechanisms other than marker flip flops 62 and 64 respectively. For example, as was described in U.S. Pat. No. 4,837,740, in an asynchronous system, signals indicative of the full or empty state of the registers may be derived as the exclusive OR of two control signals to the register. This form of marker may also be used in the counterflow computing pipeline.

Figure 2B:
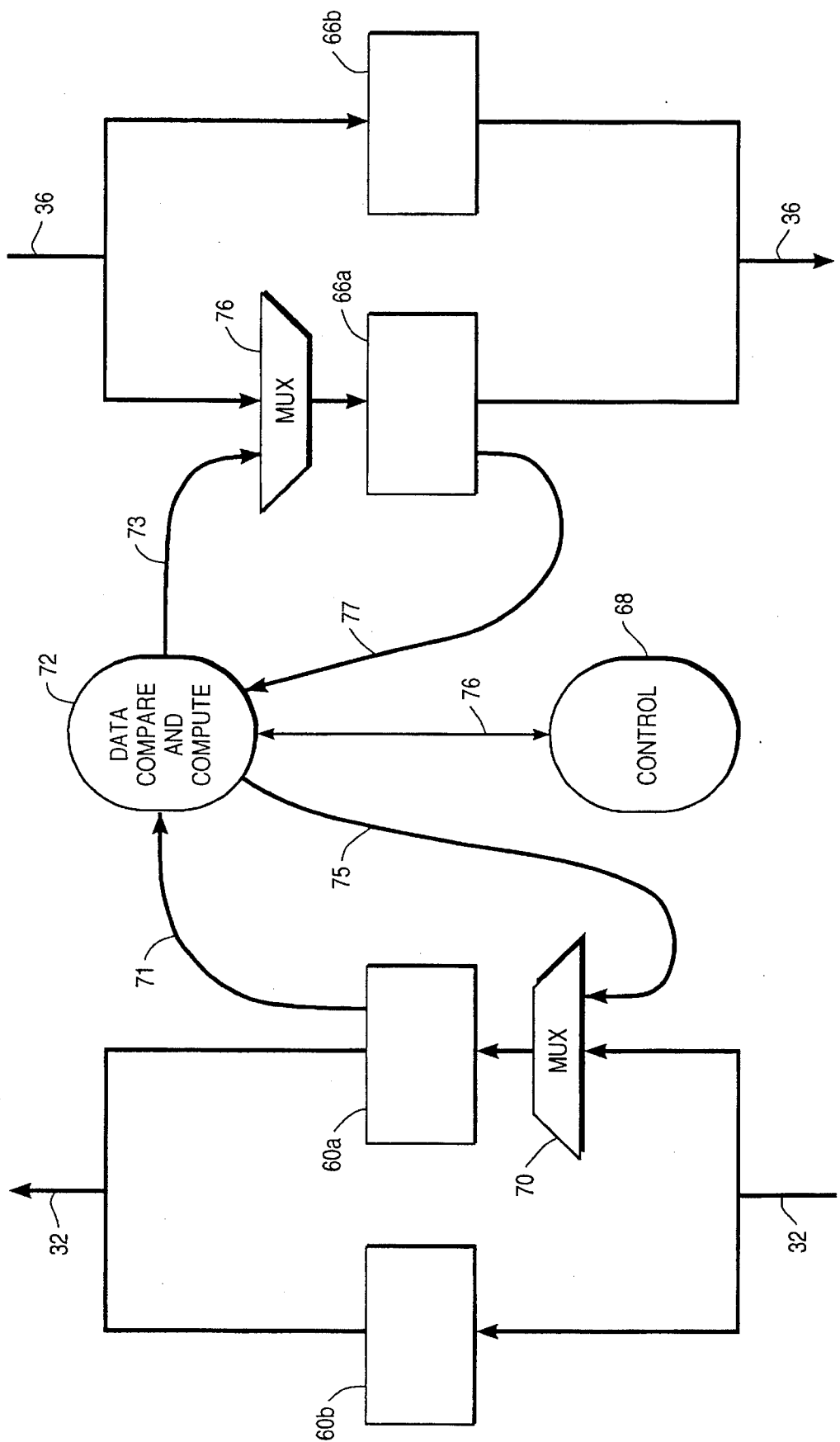
FIG. 2B is a block diagram of the register and comparison means and data computation devices within a single stage of the counterflow pipeline.

Control circuitry 68 in each stage connects to registers 60 and 66, and to flip flops 62 and 64. In addition, each stage of the counterflow computing pipeline may contain comparison circuits as illustrated in FIG. 2B. In this figure the upward register 60 of FIG. 2A has been divided into two parts, 60a and 60b, and the downward register 66 of FIG. 2A has been divided into two parts, 66a and 66b. One or both parts of each register may have a multiplexor 70 and 76 attached to its input so that it can take data either from the communication path inputs or from the comparison and computing block 72. The registers, multiplexors and external control signals are all managed by the control circuit 68. In most applications every stage will contain at least a minimal comparison circuit in order to provide for the "countersynchronized comparison" property possible for counterflow pipelines.

As shown in FIG. 2B, a comparison circuit, a part of the comparison and computing block 72, can compare part 60a of the upward register 60 with part 66a of the downward register 66. Of course the comparison might encompass more or less or even all of either register if desired, the fact that a particular part is illustrated in FIG. 2B is for illustration only. In FIG. 2B these comparison circuits are illustrated as working on approximately half of the information in each of the registers, provided along data paths 71 and 77, respectively. In various embodiments of the invention, however, these circuits may make use of more or less of the data available in the register depending on the computing task at hand.

The comparison circuits in the comparison and computation block 72 may perform some arithmetic or logical comparison, detecting one or more "match" conditions. These match conditions are reported to the control circuitry along the control paths 76. These match conditions might be computed on the basis of a bit by bit comparison of some fields of data within the two registers. For example, a match might be declared if the first letter of an upward bound English word matched the first letter of a downward bound English word. Alternately, a match might be declared if the arithmetic value of some field of one register exceeds the value of a field in the other register. Those skilled in the art will recognize a wide variety of "match" conditions that might be detected for different purposes.

It is also possible, and sometimes useful, to have a plurality of match conditions for different purposes. Some kinds of matches might cause a modification in the upward bound data element, others might cause modification in the downward bound data element. The amount and kind of modification might be controlled by the particular kind of "match" that was detected.

Under control of these match conditions, circuits to modify the content of the registers are brought into play. In FIG. 2B these modification circuits involve data outputs from the comparison and computation block 72. The output data from this block may be any computable function of its inputs. Thus the values sent to the multiplexor 70 in the upward bound data path along data path 75 might be any combination of the data values in the upward register separately, or in the downward register separately, or some combination of both. Similarly the values sent to the multiplexor 76 in the downward bound data path along data path 73 might be any combination of the data values in the upward register separately, or in the downward register separately, or some combination of both.

In particular, the modification circuits illustrated in FIG. 2B are intended to include the possibility that data may be copied from one register into all or part of the other register. The fact that the multiplexor 70 feeds only a part 60a of the upward bound register 60 is not intended to so limit actual circuits. Those familiar with the art will recognize at once that the relative size of the fixed portion 60b and the multiplexor-fed portion 60a of such a register might be chosen arbitrarily to meet the needs of a particular application. Similarly, in FIG. 2B it may appear that the same portion 60a of the upward bound register is used both as input to the data compare and compute circuits 72 and as the portion to be modified, but this is not intended so to limit actual designs. Those skilled in the art will recognize that any portion of the upward bound register 60 might be used as input to the data compare and compute circuits, and any other portion of the register 60 might be connected to the multiplexor, and that these two portions might overlap, if at all, in any desired way.

The modification circuits illustrated in FIG. 2B are intended to portray a wide variety of special operations that might be performed on the content of one register alone. The circuits of FIG. 2B are intended also to portray circuits that combine the content of the two registers and modify one or both of them as a result. Those skilled in the art will quickly recognize that any number of such modification circuits could be included in a counterflow processing pipeline. Those illustrated are intended only to be suggestive of the wide variety of possible computing configurations that might be used.

The operation of the stage of the counterflow computing pipeline is controlled by a control system. This control system may be local to a particular stage of the pipeline as is illustrated as 68 in FIG. 2A and FIG. 2B.

Figure 3:
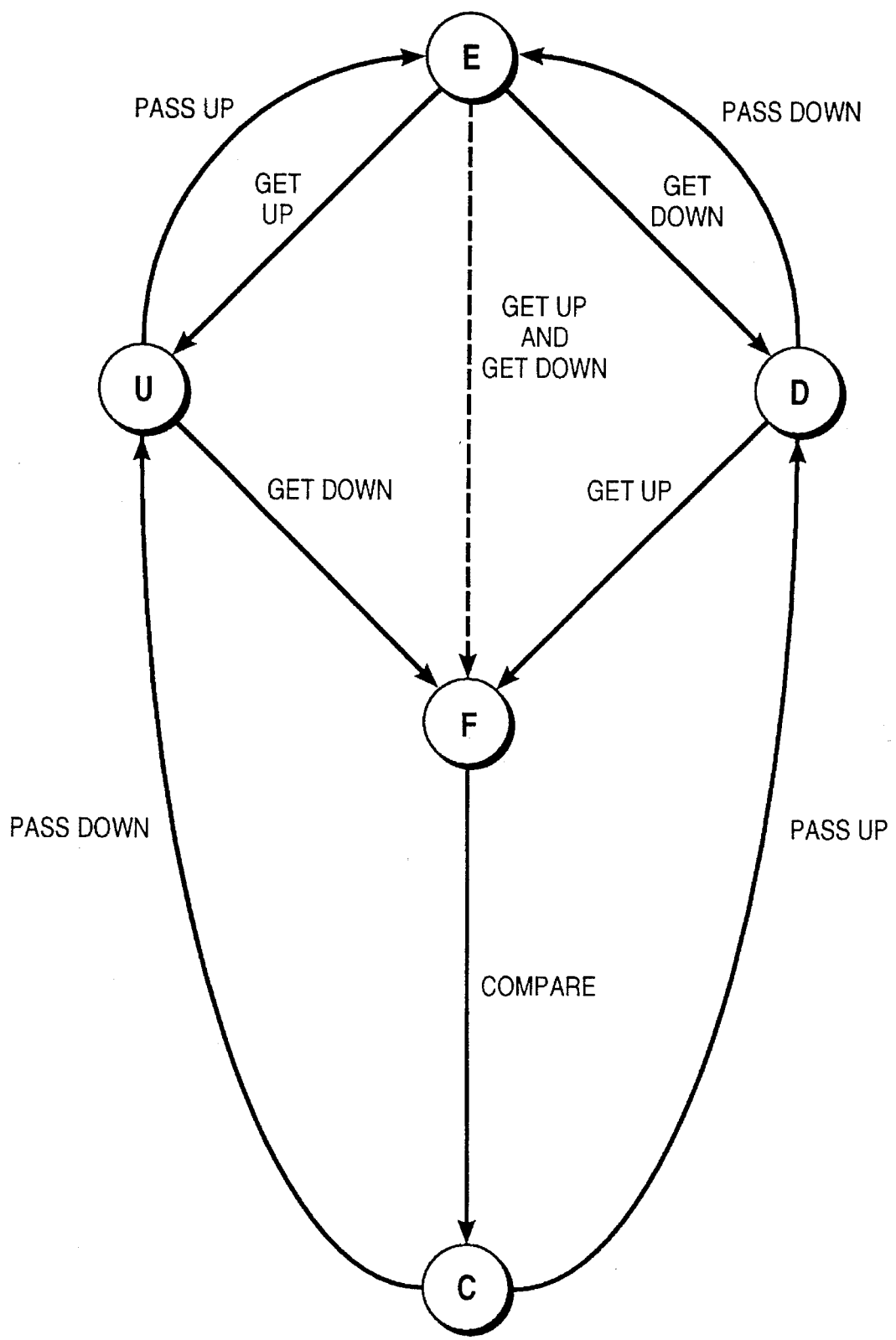
FIG. 3 is a state diagram for a single stage of the counterflow pipeline showing its 5 major states.

The control system preferred for the basic counterflow computing pipeline can best be understood with reference to the state diagram of FIG. 3. The five circles in this state diagram represent the five major states through which a single stage of the counterflow computing pipeline may pass in use. Of these major states four have already been mentioned, namely (F), (E), (D) and (U). These names are totally arbitrary; the particular names used are not, of course, relevant to the operation of the invention.

The arrows in FIG. 3 represent possible changes in the basic state of the single stage being described. Thus, for example, the arrival of a new upward bound data element, illustrated by the arrow labeled "get up", can change the state from (E) to (U) or from (D) to (F). Similarly the arrival of a new downward bound data element, illustrated by the arrow labeled "get down", can change the state from (E) to (D) or from (U) to (F). Similarly, departure of an upward bound data element, illustrated by the arrow labeled "pass up", can change the state of the stage from (U) to (E), and departure of a downward bound data element, illustrated by the arrow labeled "pass down", can change the state of the stage from (D) to (E).

The transitions between states shown in FIG. 3 have been described in part above. The following is a complete description of data arriving. When empty (E), each stage of the counterflow computing pipeline can get a data element from either of the data streams. Thus there are two state transitions leaving the empty (E) state in FIG. 3. These are: 1) if the stage gets an upward data element it will enter the state (U); 2) If it gets a downward data element it will enter the state (D). Note, as shown in the figure, that from the (D) state the stage may still get an upward flowing data element to become full (F), and similarly form the (U) state the stage may still get a downward flowing data element likewise to become full (F). It could happen that from the empty state an upward and a downward flowing data element arrive concurrently, and thus the system might move from state (E) directly to state (F). This possibility is illustrated in the figure as a dotted line because its action is subsumed by the separate arrival of the two data elements. FIG. 3 faithfully reports that unless the stage is full (F), it can accept a data element into whichever or both of its registers that are not already occupied.

Departure of data elements from the stage is more restricted. In FIG. 3, there are no arrows leading from the state (F) to any state other than (C). Thus if the stage contains only a downward flowing data value, state (D), it may pass that element on and move to state (E). Similarly if the stage contains only an upward flowing data value, state (U), it may pass that data element on and move to state (E). If it has both data elements, state (F), however, it may pass neither of them until the comparison is complete, state (C). The state diagram of FIG. 3 indicates that after a stage has reached state (F), and until the stage reaches state (C), data elements are forbidden to leave.

In order to understand the proper functioning of the pipeline it is necessary to understand the fifth state of the state diagram of FIG. 3, called (C) for "Complete".

Passage from state (F) of the state diagram to state (C) involves the comparison operation on the two data elements. When state (F) is reached, both data elements are present at once and they must be compared. When the comparison is complete and any actions required by any of the "match" conditions is complete, the system is said to have reached state (C), as in Complete, and the data elements are then free to leave. Preferred embodiments of the invention faithfully implement these state transitions. Implementing them properly ensures the complete and non-redundant comparison property called "countersynchronized comparison" that is highly useful in certain applications of counterflow pipelines.

Which state a stage of the counterflow computing pipeline occupies might be indicated by three flip flops, two of which are shown in FIG. 2A. The two marker bits shown in FIG. 2A, 62 and 64 can indicate whether the two registers are occupied. A third indicator is required to report whether or not the Complete state (C) has been reached. There are many mechanisms that might be used to indicate the state of the stage. For example in the asynchronous embodiment of the invention, the state may be derived from several control signals as will be discussed later. Those skilled in the art will recognize many diverse mechanisms for discriminating the five basic states. Moreover, as we shall later see, each of the five basic states may be further divided into many sub-states. What is important to certain applications of the counterflow computing pipeline is that these five basic states be distinct and that the transitions between them have the character shown in FIG. 3 so that the counterflow pipeline may offer the "countersynchronized comparison" property.

Special circuitry may be included in the control system for each stage of the counterflow computing pipeline or between stages to ensure orderly passing of data according to the rules outlined in the state diagram of FIG. 3. Were the state diagram of FIG. 3 simpler, separate controls for the upward and downward flows of data might be used. But a more complex control is preferred because the state diagram of FIG. 3 requires that once full, each stage must complete a matching or comparison and attendant data modification operations before passing data in either direction. Those skilled in the art will be able to devise many such control circuits. Two of them will be described below, one for a synchronous embodiment, and one for an asynchronous embodiment.

SYNCHRONOUS CONTROL

Figure 4:
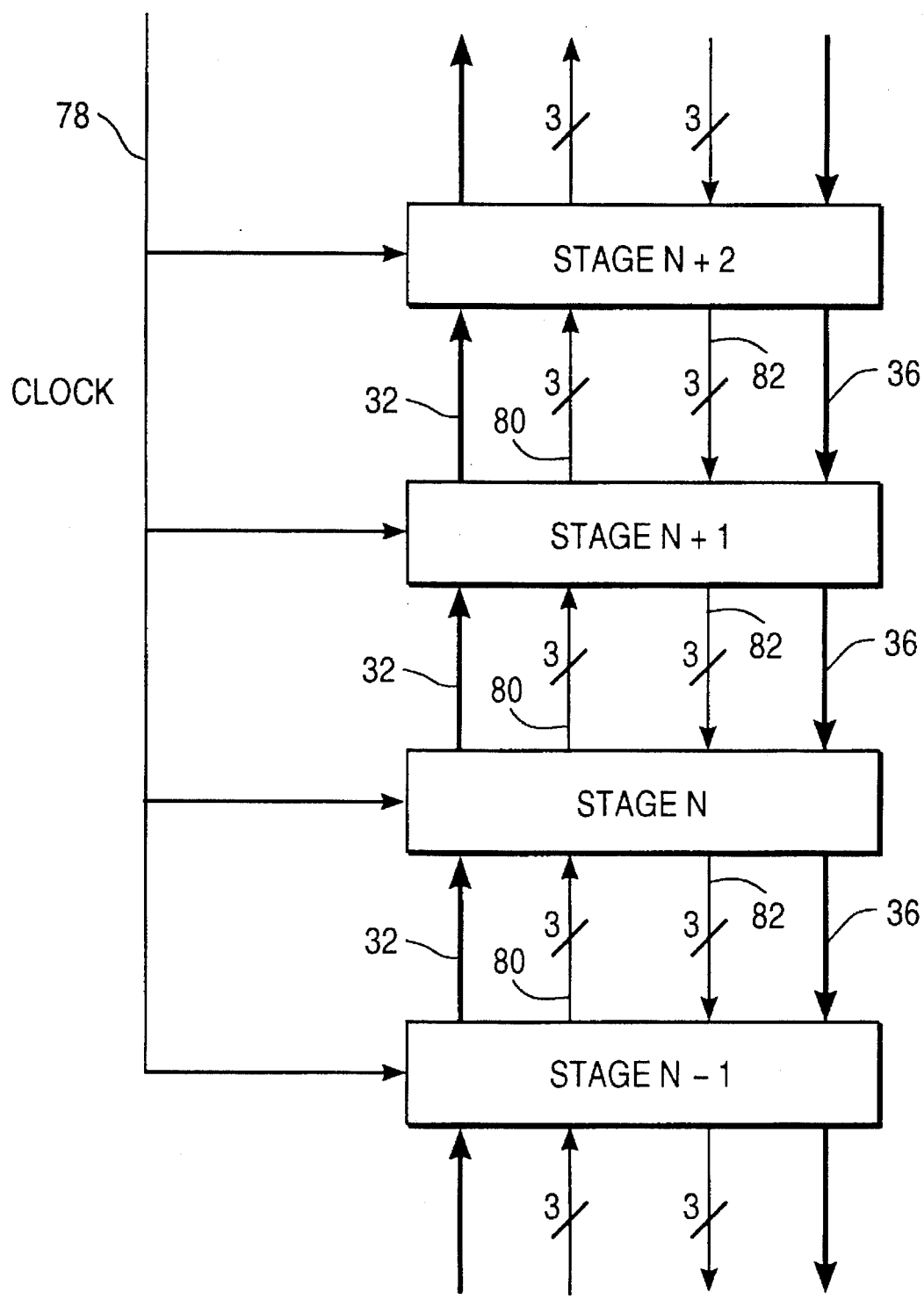
FIG. 4 is a detailed diagram of a possible set of communication and clocking signals for a synchronous implementation of the counterflow pipeline.

A synchronous form of the control is illustrated in FIG. 4, with particular focus on the communications between stages. Each stage informs its neighbor of its present state using the signaling circuitry 80 and 82 shown in the figure. Each of these signaling circuits is marked with a slash and the numeral "3" to indicate that three bits of information are preferably provided to give a full account of the state of the reporting stage. During the interval between clock pulses provided by clock 78, each stage has all the information required to decide whether data should move in the communication paths between it and its neighbor, and if data are to move whether the transfer should be up or down. There are only 25 cases corresponding to the product of the 5 states possible in each of the two adjacent stages. The combined state of the two stages is designated by the two letters representing their separate states, recording the state of the lower stage first. Thus, for example, (E, D) means that the lower stage is empty and the upper stage has downward bound data.

Of these 25 possible paired states, upward data flow is possible only in the paired states (U, E) (C, E) (U, D) and (C, D). Only these states permit upward flow because only these states have space for the upward bound data in the stage above, and available upward bound data in the stage below. Similarly, only the paired states (E, D) (E, C) (U, D) and (U, C) permit downward transfer of data. Note that in paired state (U, D) either upward or downward flow of data is possible, but one data motion or the other must be chosen.

To permit both at once would allow an upward bound data element and a downward bound data element to exchange places and pass without being compared in either stage. This would prevent the pipeline from providing a complete comparison and thus destroy its "countersynchronized comparison" property.

The synchronous control, then, can decide when to move data on the basis of the combined states of adjacent stages. In the case (U, D) both stages must make the same decision. One could design a control in which that decision is always to pass data up, always to pass it down, or to choose alternately, or according to some other rule. As long as both stages agree on the rule, any rule will work.

ASYNCHRONOUS CONTROL

The asynchronous embodiment of the invention may be somewhat more complex. The fundamental difficulty is inherent in the state diagram of FIG. 3. From state (D) a stage may pass data downward, but after arrival of an upward bound data element that propels the stage into state (F) it may no longer pass the downward bound data. Thus the control system must be prepared to decide cleanly whether or not it is proper to pass a data element in the face of asynchronous arrival of another in the other data path. This decision is exactly the decision as to whether the communication path adjacent to the stage is to be used in the downward bound or upward bound direction.

Understanding this need makes the required control simpler to understand. One way to provide the required decision is to place an arbiter circuit with each communication path to provide a clean answer in the case of a conflict between upward bound and downward bound data. Such a conflict arises in the (U, D) state, i.e. when the lower stage can communicate upward and the upper stage can communicate downward, just as it did in the synchronous control. An asynchronous control system, however, cannot decide which direction to move data merely on the basis of priority or alternating service. The decision is more complex because no data may have passed recently and then suddenly a request for an upward bound and a downward bound communication may arrive at nearly the same moment in time.

It is well understood by those familiar with asynchronous systems that the very nearly simultaneous arrival of conflicting requests must be handled with care. Arbiter circuits to deal with this kind of conflict are well known in the art. Suitable arbiter circuits are described in Charles L. Seitz, author, in "Ideas about Arbiters," the magazine, Lambda, First Quarter 1980 or Philip J. Keller, "Arbiter Circuit," U.S. Pat. No. 4,398, 105.

Figure 5:
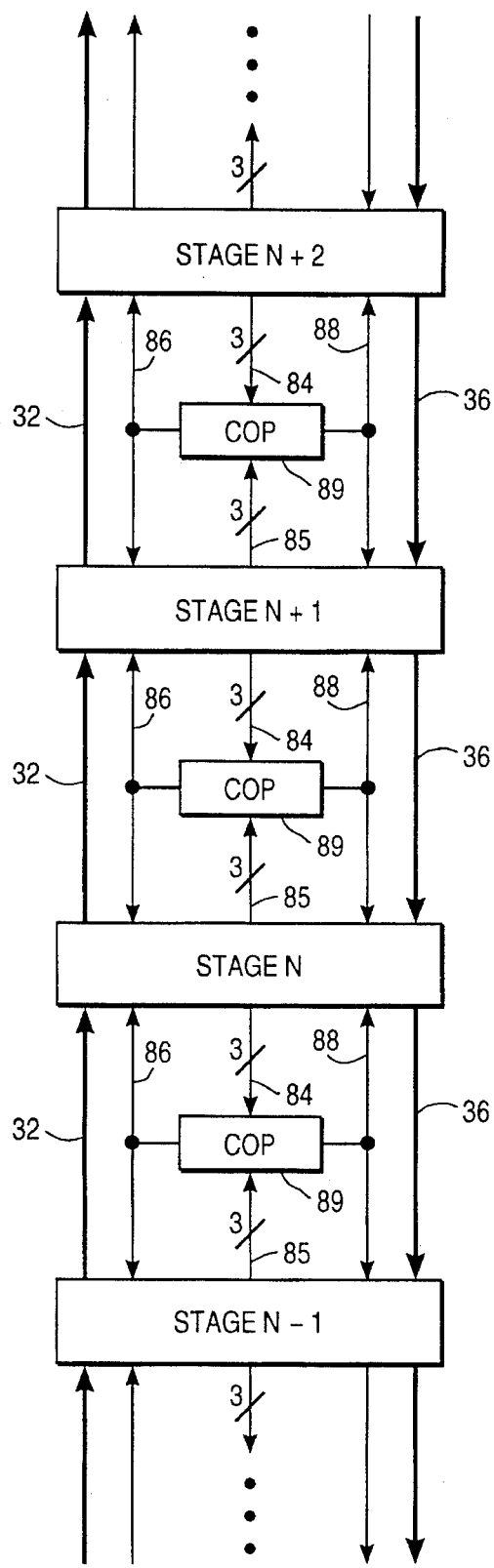
FIG. 5 is a block diagram of an asynchronous implementation of the counterflow pipeline showing arbitration units labeled "COP" between each of the stages.

FIG. 5 illustrates the system block diagram for the preferred asynchronous design. Between each pair of stages lies a "COP" 89 incorporating an arbiter to resolve any conflicts about which way the signals are to flow. The stages indicate their desires to the COP along the control paths 84 and 85. These control paths are marked with a slash and the digit 3 to indicate that at least three bits of state must be indicated corresponding to the states of FIG. 3. Using its arbiter, the COP directs the flow of data between the stages, informing the stages via control paths 86 and 88 whether the upward communication path 32 or the downward communication path 36 is next to be used. The COP need not participate in the actual flow of data, it merely gives permission to the adjacent stages to move the data up or down, The sender and receiver communicate the data using the data paths 32 and 36 and whatever control paths are required between them to control the details of the data flow, In FIG. 5 only the control paths required to make the decision between upward and downward flow of data are illustrated. Additional control paths, not shown, will be required to control the flow of data along the data paths 32 or 36 as may have been chosen.

One embodiment of the control system uses the following signals to and from the COP. The signals are event signals, as described in the Micropipelines paper heretofore cited, and may be seen in FIG. 10. In the downward control path 84:

| In the downward control path 84: | |
|---|---|
| AU? | I can accept an upward flowing data element |
| PD? | I can pass a downward flowing data element |
| CD | My control system is ready for another communication. |
| In the upward control path 85: | |
| PU? | I can pass an upward flowing data element |
| AD? | I can accept a downward flowing data element |
| CU | My control system is ready for another communication. |
| Outputs from the COP: | |
| GU! | You may communicate upward (control line 86) |
| GD! | You may communicate downward (control line 88) |

The signals with "?" in their names and the CD and CU signals indicate to the COP the readiness of the two stages to communicate. The COP decides which direction communication is to take place and tells the two stages what to do with the signals with a "!" in their names. Under control of these signals the stages can perform their actions properly.

Those familiar with the art will recognize that a variety of communication protocols and mechanisms are possible in such a design. For example, the communication of the data may be accompanied by simple control "events" as contemplated in U.S. Pat. No. 4,837,740. Alternatively a "four phase" control system might be used. Although FIG. 5 shows separate data paths for the upward and downward flowing data, a common set of reversible wires might be shared for this communication because data will flow in only one direction at a time. Similarly, the communication might be done in parts either as a serial communication a single bit at a time, or in bytes. Such a serialization or partial serialization might be chosen to reduce the number of data wires required, but would, of course, render the communication slower.

The system preferably prevents premature departure of data elements prior to reaching the complete state (C). This restriction is accommodated by providing additional completion or "freedom" signals to the COP. The COP will grant permission to communicate only if both of the two stages declare themselves ready for another communication event. The CD and CU signals which are part of the control paths 84 and 85 shown in FIG. 5 provide this information to the COP. The COP will permit data to pass only when requested to do so by suitable combinations of "?" signals and only when the CD and CU signals that it receives indicate that both stages are ready for another communication action.

THE ACTION OF THE COP

The COP of FIG. 5 may be implemented using an arbiter whose action will now be described. FIG. 6 is a state diagram for an arbiter that may be used. There are 8 states labeled 1 through 8. There are 16 transitions between these states labeled R1, R2, G1, G2 and C. The action of the arbiter is as follows. In response to request signals R1 and R2 that may come at any time, or even at exactly the same time, the ARBITER will make one and only one grant of service. The ARBITER indicates its grant of service by sending a signal on either the G1 or G2 outputs, but never both. In the one case of conflicting requests, leaving state 4, arbitration is required to decide whether to produce a G1 or G2 signal. Special circuits well known to those skilled in the art can make such a decision cleanly and avoid the unreliability caused by metastability by postponing any announcement of a decision until after the end of metastability.

Figure 7:
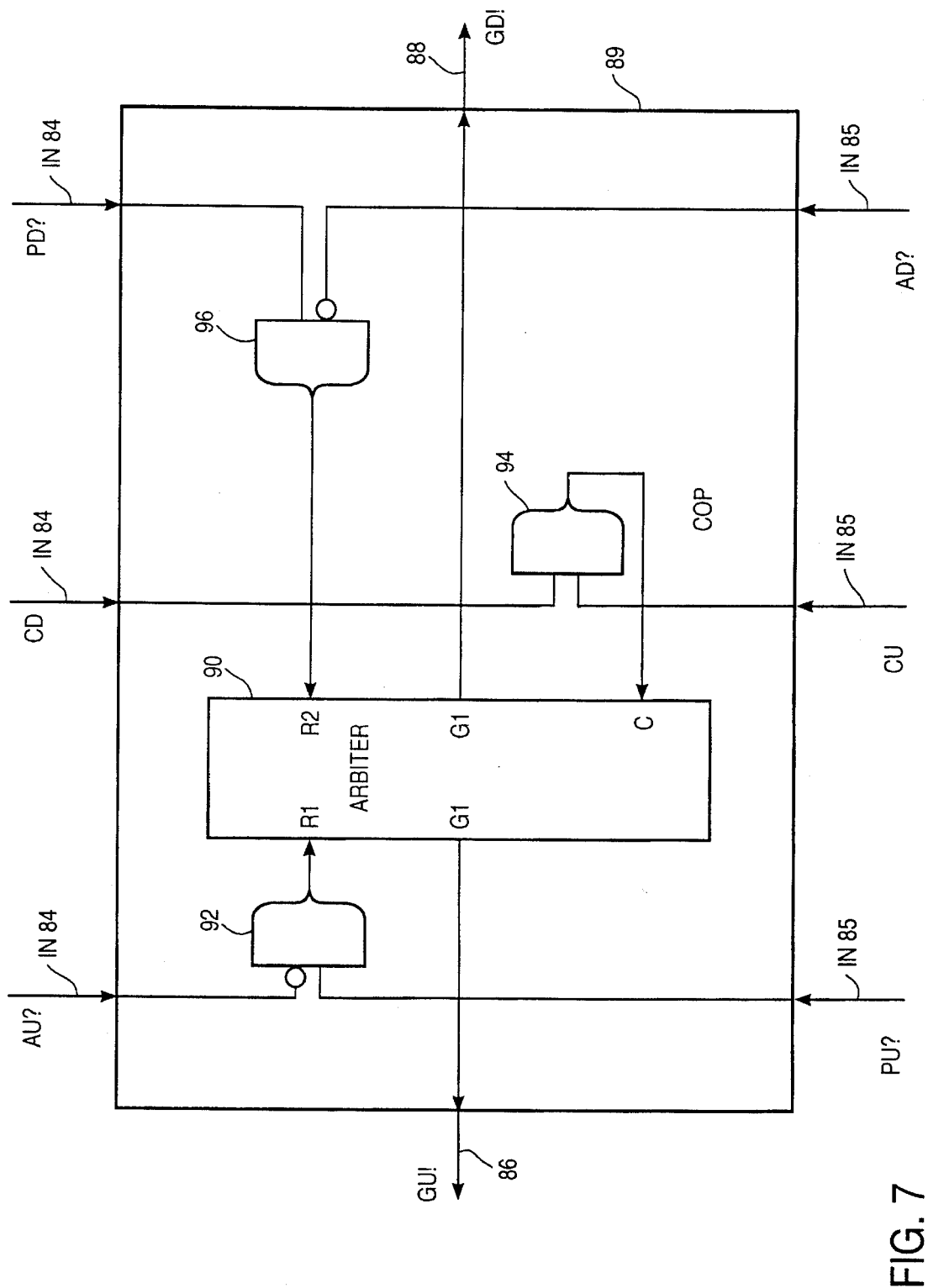
FIG. 7 is a block diagram of a possible implementation of the COP using the ARBITER of FIG. 6.

FIG. 7 shows how this form of arbiter can be included in a COP circuit 89. Three Muller C elements 92, 94 and 96 combine the incoming control signals as shown. Muller C element 92 combines the AU? and PU? signals to form the R1 request to the arbiter. This combination indicates that data could flow upward if the arbiter permits. Similarly, Muller C element 96 combines the AD? and PD? signals to form the R2 request to the arbiter. This combination indicates that data could flow downward if the arbiter permits. The bubbles on the inputs of these two Muller C elements indicate that initially, when the pipeline is completely empty, any stage is ready to accept a data input.

The Muller C element 94 combines the CD and CU signals to provide the C signal for the arbiter. This combination indicates to the arbiter that both stages are ready for another communication event.

ASYNCHRONOUS CONTROL INSIDE A STAGE

Figure 8:
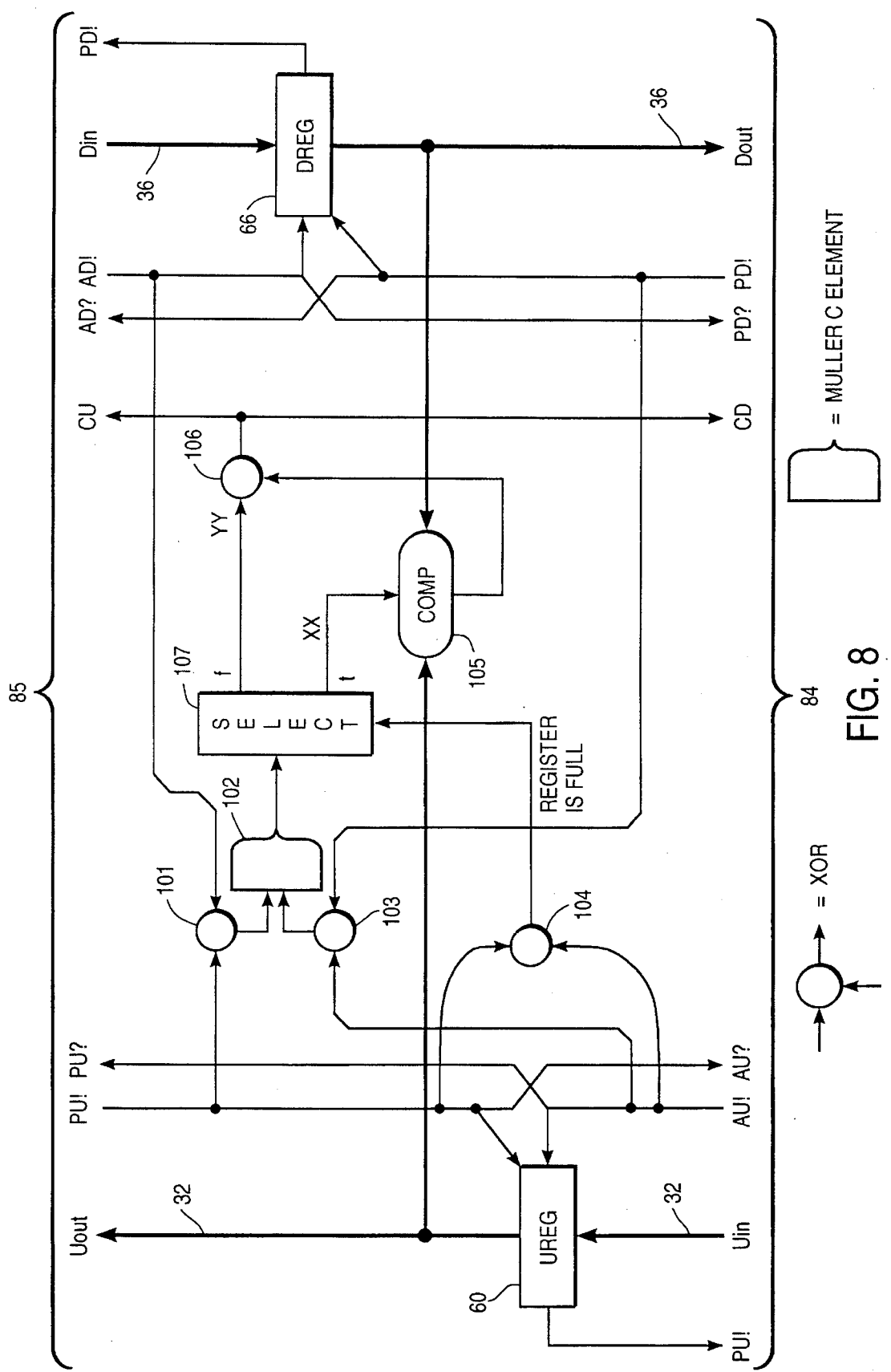
FIG. 8 is a block diagram of the control mechanism required for one stage of an asynchronous embodiment of the counterflow computing pipeline showing mechanisms to detect when the register means are full and when to release the arbitration mechanisms.

A simple form of asynchronous control inside a stage is illustrated in FIG 8. In this figure the upward bound register, UREG, 60 and the downward bound register 66 are implemented as transition controlled registers as described in U.S. Pat. No 5,187,800. Such registers are controlled by events on two control inputs. In the registers 60 and 66 of FIG. 8 these two inputs are distinguished because one of them enters from the side of the box and the other enters at a corner. An event entering from the side of the box causes the register to capture whatever data are then passing through it. When the data have been captured, an event output is produced at the far side of the box. Thus, for example, an event coming in on the AU! input at the lower left of FIG. 8 will cause the UREG to 1) capture the data presented at the Uin data input, thus preventing subsequent changes in value of the Uin data to influence the data output at the Uout output and 2) then produce an output on the PU! output control path.

An event on the control input shown coming into the box at its corner causes the register to release its hold on data and become transparent. Thus, for example, an input event arriving at the PU! input at the top left of FIG. 8 will cause the UREG 60 to become transparent and it will subsequently copy data from the Uin data input to the Uout data output.

To aid in understanding the actions of the control signals shown in FIG. 8 let us review briefly the essential properties of event signaling. This summary is given in expanded form in the reference. In this form of signaling the change in electrical state of a wire signals an event, but the direction of the change, either HI to LO or LO to HI is immaterial. The ordinary exclusive or gate, XOR, represented in FIG. 8 as a circle such as 101 provides an "OR" function for this form of signaling, because for every state of either of its inputs, an XOR circuit changes its output state. In reading the diagram of FIG. 8 it is useful to remember that an event arriving at either input of an XOR, drawn as a circle, is delivered immediately to its output.

The Muller C element, such as 102 provides an AND function for events. Its output state changes to HI only when both inputs have become HI and changes to LO again only after both inputs have become LO. If one input is HI and the other LO, the Muller C element remembers and retains its previous state. Thus an event output from a Muller C element requires both an event input on its first input and an event input on its second input. In reading the diagram of FIG. 8 it is useful to remember that an output event from the Muller C element 102 requires an input event on each of its two input terminals, i.e. as outputs of the two XOR elements 1 01 and 103.

A third type of event controlling device is shown in FIG. 8, the SELECT unit 107. This device steers an input event from left input terminal to one of its two right terminals, labeled "t" and "f" depending on the value of the input it receives on its bottom terminal. A suitable circuit to perform this function is well known to those skilled in the art. When the SELECT element 107 gets an event from the Muller C element 102 it produces an output event on either its t output, connected to the wire labeled XX or its f output connected to the wire labeled YY. Which output the selector chooses depends on whether the signal labeled "register is full" is true or false. This signal is produced in such a way as to report whether data are present in the UREG.

The action of the control circuit of FIG. 8 will now be described. Remember that the COP below this stage will permit a communication to take place in only one direction. Its choice is indicated to the circuit of FIG. 8 with the AU! or PD! inputs to this control circuit as will be explained in connection with FIG. 10. Thus for each communication with the stage below, one and only one of the two inputs AU! or PD! will arrive. The XOR circuit 103 combines these events so that the output of XOR circuit 103 indicates that a communication has taken place on the lower communication path. Similarly because of the action of the COP above this stage, only one of the two input events PU! and AD! can happen. Thus because the XOR circuit 101 combines these events its output indicates that a communication has taken place on the upper communication path. An output event from the Muller C element 102, therefore, indicates that both an upper and a lower communication event has happened.

Given that the stage illustrated in FIG. 8 started out in the empty (E) state, the output of the Muller C element provides a great deal of information about the state of the stage. In particular, because the Muller C element output indicates that a communication has happened both above and below this stage, the stage must be either in state (E) or in state (F). It will be in state (E) under three circumstances. 1) it was in state (E) and an upward data element has come in from below and left above; 2) it was in state (E) and a downward data element has come in from above and left below; 3) it was in state (C) and both data elements have left, one up and one down. The stage will be in state (F) under three circumstances: 4) it was in state (E) and an upward and a downward data element both arrived, one from above and the other from below; 5) it was in state (F) and an upward data element left and was replaced by another; 6) it was in state (F) and a downward data element left and was replaced by another.

The selector 107 separates the output events of the Muller C element 102 into those that correspond to the full state (F) and those that correspond to the empty state (E). An event on the wire labeled YY corresponds to reaching the empty state, and an event on the wire labeled XX corresponds to reaching the full state. Whenever the full state is reached, the stage should do its matching and computation process, as indicated by the lozenge 105 labeled COMP which was previously described in FIG. 2B. This process uses data from both of the registers, as indicated by the dark lines. When the COMP process is finished, the stage has reached the complete state (C). The control output of the COMP lozenge 105 is connected to the XOR circuit 106 which in turn develops the CU and CD signals. These signals report the stage ready for the next communication events.

BRANCHING

Figure 9:
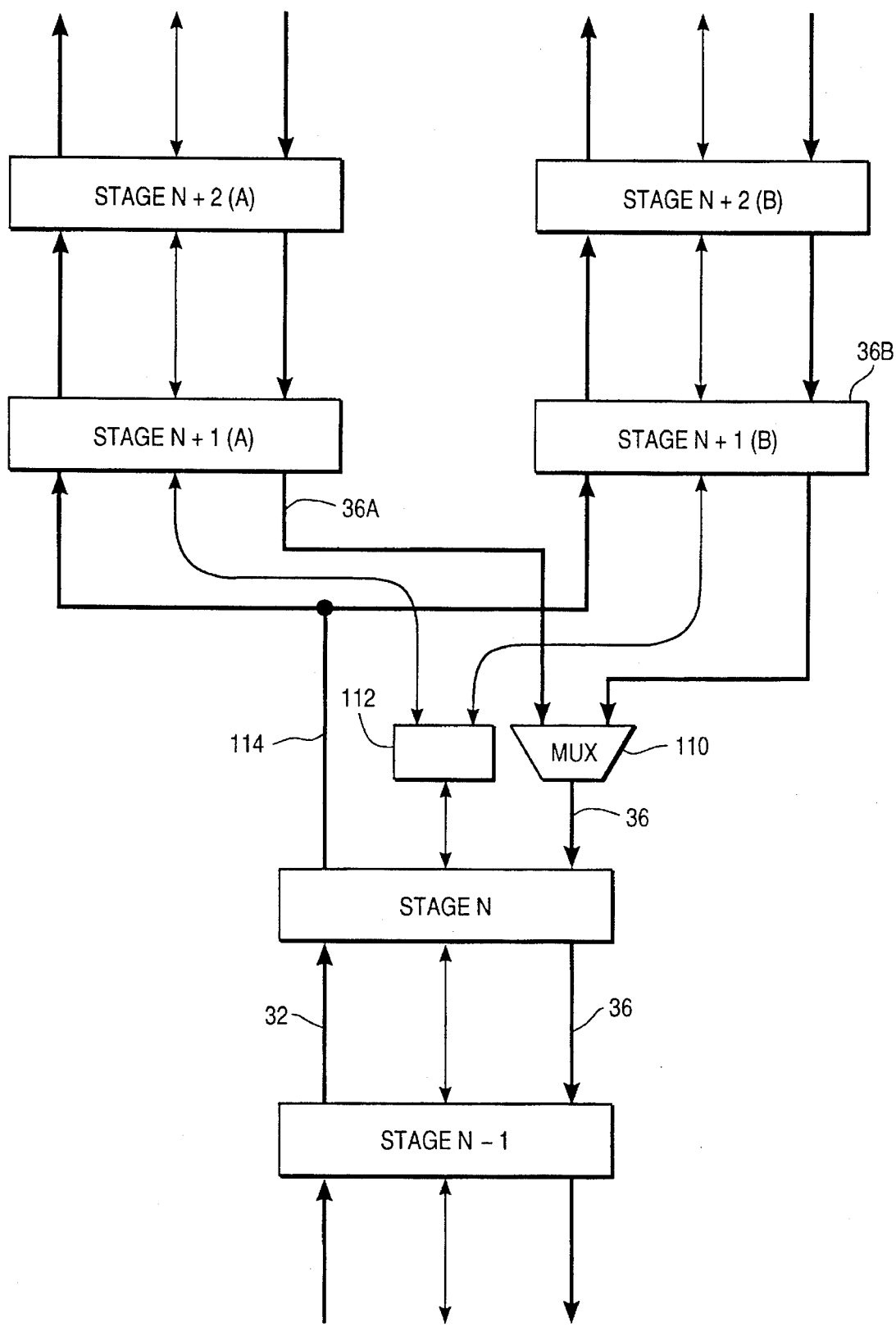
FIG. 9 is a block diagram of a bifurcated pipeline. Above the bifurcation point there are two counterflow pipelines and below it there is only a single pipeline. At the bifurcation point the upward data flow path divides and the downward flow combines.

FIG. 9 is a block diagram of a counterflow pipeline that branches. There is a bifurcation point just above STAGE N of the pipeline. Notice that where stage N+1 previously occupied the position above stage N, as in FIG. 1B, here there are two such stages, N+1(A) and N+1(B).

The bifurcation requires modification of the upward data path, the downward data path, and the control path. At the bifurcation point, the upward data flow path 114 divides to feed the upward data flow path in the two pipelines above. At the bifurcation point the two downward data flow paths 36A and 36B combine in one of several ways. In FIG. 9 we have illustrated the use of a multiplexor 110 to feed the single downward data flow path 36 below the bifurcation point. It must be recognized, however, that the data from 36A and 36B might be combined in any logical way including but not limited to: 1) by addition, 2) by concatenation, 3) by Boolean combination, or 4) by selection as illustrated in FIG. 9.

The control signals from below and above the bifurcation point are combined in a control block 112 that controls the action of the stages above and below it.

Different control circuits will produce different behavior at the bifurcation. In order to characterize a particular control circuit one must consider its treatment of upward bound and downward bound data. Several possible variations have been discussed previously including directing upward bound data alternately to the two upward bound paths, directing upward bound data to both paths, directing upward bound data to one path or the other depending on some characteristic of the data itself, and directing upward bound data to whichever path is free to accept it. In an asynchronous implementation this latter choice may require arbitration.

Combining the downward flows may be slightly more complex. In an asynchronous implementation most forms of combining the data from above require arbitration. One that doesn't combines data elements from both downward bound paths into a single larger downward bound package, waiting until there is data available from both STAGE N+1(A) and STAGE N+1(B). Other choices are to combine the data alternately, or on a first come first served basis. Those skilled in the art will quickly see that any of a wide variety of combination methods is possible.

In most pipelines it is convenient to think of each stage as having a single register for upward bound data and another for downward bound data. It is also possible, however, for a single stage of the pipeline to have more than one register for data traveling in one or the other direction or both Such a system must be capable of multiple comparisons so that each of the several upward bound data values present in the stage may properly be compared with each of the downward bound values.

The counterflow pipeline described here can be applied in a number of ways, a particular one of which is described in a co-pending patent application entitled Counterflow Pipeline Processor, filed even date, assigned to the assignee hereof, and incorporated by reference herein. Other applications for which the counterflow pipeline described herein may be used include, but are not limited to, text comparison engines, signal processors, convolution engines, associative memories, inventory look-up engines, and microbiology applications such as gene matching and protein structure analysis.

PREFERRED EMBODIMENT

REGISTERS

The preferred embodiment of the counterflow pipeline uses the data path configuration already illustrated in FIG. 8. Two event controlled registers 60 and 66 serve to hold the upward bound and downward bound data elements. These registers are controlled by event signals as illustrated and previously described.

COMPARISON CIRCUITS

The preferred embodiment of the counterflow pipeline uses the comparison already described in general terms in FIG. 2B. In one embodiment of the device each data element of 32 bits is accompanied by a register number, or address, of 8 bits. These register numbers are compared by the comparison circuits and if a match is detected, various operations are performed on the register values. In particular, register values may be copied from one data path to the other, or register values may be marked for subsequent deletion from the stream.

ASYNCHRONOUS COMMUNICATION PATHS

The interface mechanism between stages for an asynchronous embodiment of the counterflow computing pipeline is a particularly simple one. It assumes that the action of passing data from one stage to the next takes place automatically. The COP in FIG. 5 tells both the sending and the receiving units that the communication may take place as is illustrated by the fact that the GU! and GD! signals go both to the stage above and the stage below the COP.

In practice, it is well to have the sender and receiver in an asynchronous communication control the timing of the communication themselves. Therefore our preferred embodiment of the counterflow pipeline uses the signaling paths illustrated in FIG. 10. The signal paths GU! and GD! are used by the COP to tell the sending unit that it has been granted access to the communication channel. The control of the actual communication occurs using the signaling paths PU! and AU! to control upward data flow and PD! and AD! to control downward data flow. As indicated by the dotted line, the sending unit generates the AU! or AD! signal from the GU! or GD! signals respectively. Thus the actions elicited by the connections shown in FIG. 10 serves the function previously described in connection with FIG. 5, but the connections shown in FIG. 10 provide for orderly completion of the actual communication functions.

Figure 10:
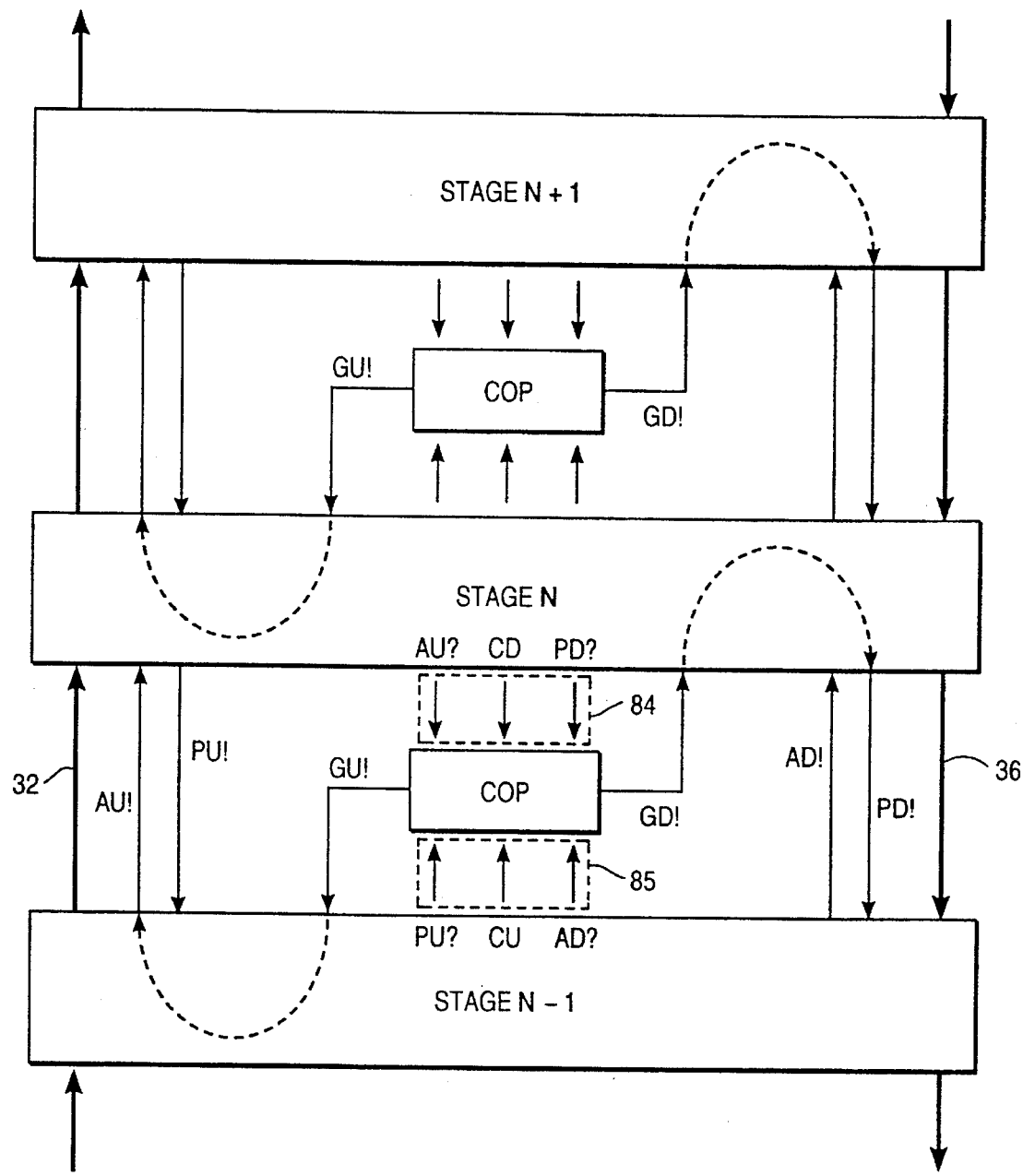
FIG. 10 is a block diagram of the asynchronous implementation for the preferred embodiment. It shows more detail about how the up and down communication is actually done.

The arrangement of FIG. 10 has an additional advantage. If it is necessary to share the data path wires between the upward and downward communication paths, as was contemplated in FIG. 1C, the lower stage can use the GU! signal as permission to put its data on those common wires, and after a suitable delay, issue the AU! signal. Similarly the upper stage can use the GD! signal as permission to put its downward flowing data on those common data wires, and after a suitable delay issue the AD! signal.

Those familiar with the art will recognize how to build other interfaces that are similar in function. For example, a more complicated communication protocol could be used to pass data elements. For example, communication in one or both directions might be partly serial, so that fewer data wires would be required between stages. Additional control wires might be required. In FIG. 10 we have separated the decision function about which direction to communicate from the communication task itself. FIG. 10 makes it obvious to those familiar with the art how to provide a wide variety of communication mechanisms.

ASYNCHRONOUS CONTROL

The control mechanism shown in FIG. 8 forms the basis of the preferred embodiment of the counterflow pipeline. For stages that neither delete existing data elements nor introduce new data elements in to the data streams, this form of control suffices. As we shall shortly see, the complete control mechanism can be built by adding to this basic control system units that can insert and delete data items.

Similarly, the control system for the COP already described in FIG. 6 and 7 suffices for the preferred embodiment.

Figure 11:
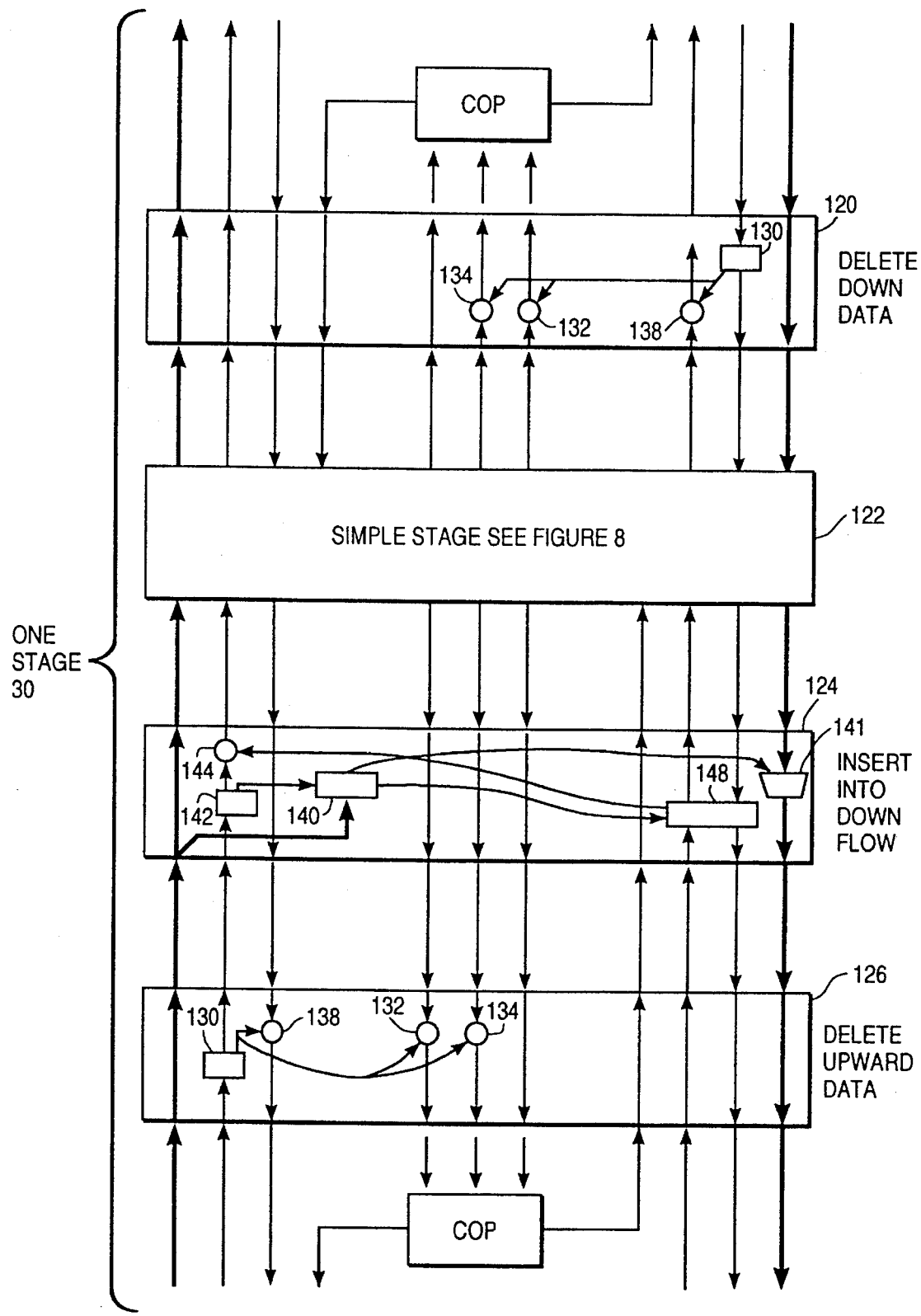
FIG. 11 is a block diagram of a single stage of an asynchronous counterflow pipeline broken into parts for deletion, insertion, and comparison.

FIG. 11 shows further detail about the interior of a complete stage 30 broken into parts. In the preferred embodiment, data flowing in either direction may be deleted from the data stream. An upward deleting circuit 126 and a downward deleting circuit 120 are illustrated for this purpose. The control mechanisms in these parts of the stage will be described later in connection with FIG. 12. In the preferred embodiment, data flowing up may, under certain circumstances, introduce data into the downward flowing stream. In the preferred embodiment, new data are never introduced into the upward stream. Thus in FIG. 11, a part 124 of the stage is illustrated for inserting data into the downward stream. The control mechanism for this part of the stage will be described later in connection with FIG. 13. An identical part, flipped and re-labeled so as to act on the other stream, could have been used to insert data into the upward stream in applications where that is desirable. The details of the action of the insertion box will be given later.

CIRCUITRY FOR DELETION

Figure 12:
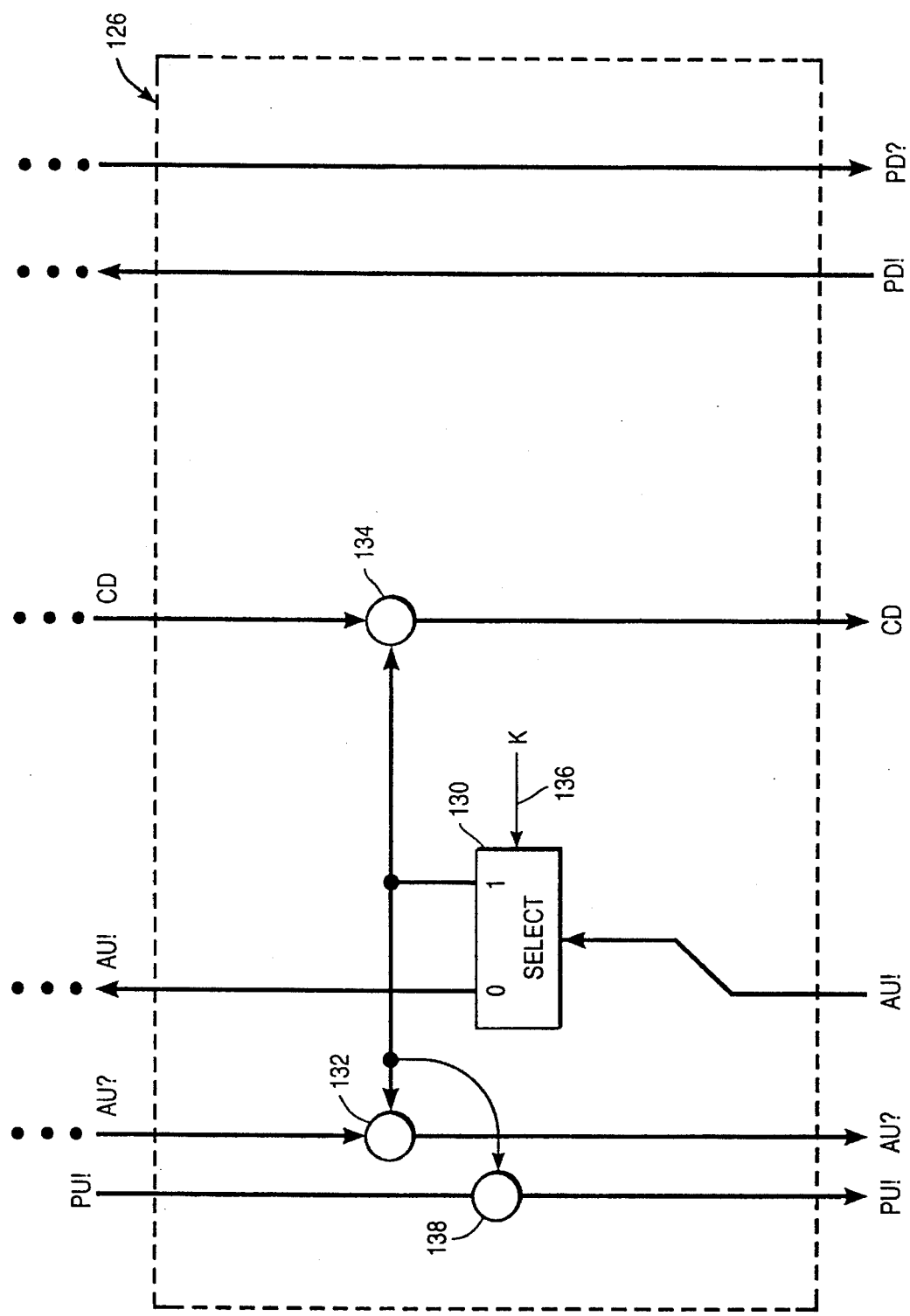
FIG. 12 is a diagram of the control mechanism required for the deletion part of the preferred embodiment.

FIG. 12 shows a detailed view of one deletion device, e.g. 126. This device is arranged to delete information flowing in the upward direction. The deletion device for downward flowing information is identical, but re-labeled and flipped so as to modify the control signals for downward flowing data. To understand how the deletion device works, remember that communication between stages involves the use of handshake signals. As illustrated in FIG. 10, for upward data flow the COP informs the lower stage, which will send the data, that it can act. The COP uses the GU! signal for this purpose. The lower stage places the data to send on the upward bound data lines 32 and then informs the upper stage that the data are ready using the AU! signal. When the upper stage has captured the data it returns a PU! signal to the lower stage indicating that the lower stage has successfully passed the data.

The deletion device works on the control signals and not on the data at all. It functions by fooling both the upper and the lower stages. It fools the upper stage by preventing the AU! signal from reaching it, so that the upper stage never knows that the lower stage attempted to pass it data. The deletion device fools the lower stage into thinking that the upper stage has accepted the data, when in fact it has not, by returning a PU! signal in response to the AU! signal just as the upper stage would have had it received the data.

The circuits of FIG. 12 accomplish this. For normal transmission, the SELECTOR 130 passes the AU! signal from below on to the upper stage. In this action the SELECTOR receives an event from below on the AU! path and passes it out the terminal labeled "0" to leave at the top of the figure out the AU! control path. If the data are to be deleted, however, the selector will be so informed along its side input 136 labeled K. The K signal tells the selector that the subsequent data element is to be deleted or "killed". If the data element is to be deleted, the SELECTOR directs its AU input event to its "1" output, where it goes to the three XOR blocks 132, 134 and 138. These XOR blocks will pass events from above down for normal communication. They also generate false outputs to their respective outputs when stimulated by the SELECTOR's "1" output.

CIRCUITS FOR INSERTION

Figure 13:
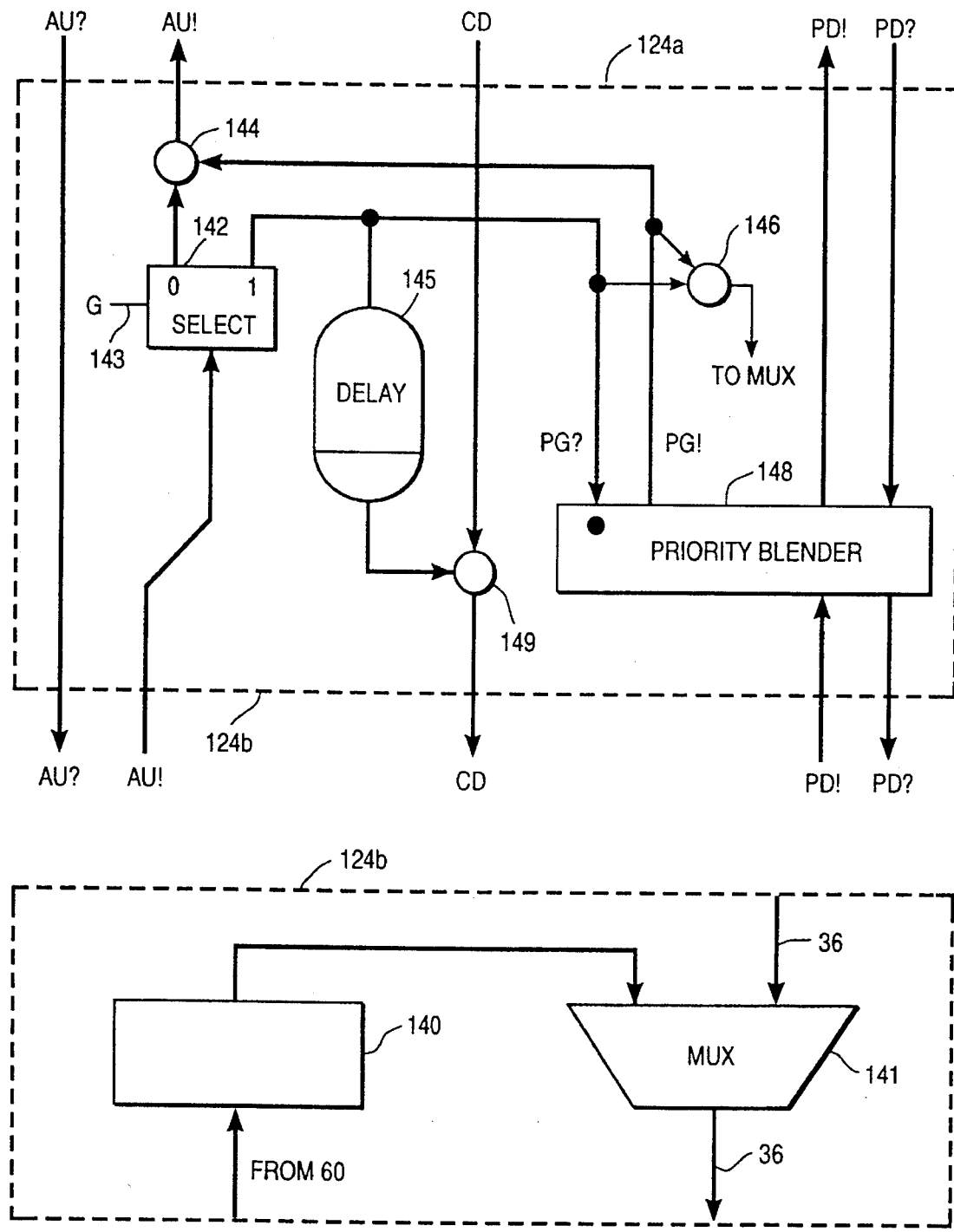
FIG. 13 is a block diagram of the insertion part of the counterflow pipeline with an extra register means for holding data to be inserted into the data streams.

An insertion device 124 is illustrated in FIG. 13, where its control parts are illustrated as block 124a and its data path is illustrated as block 124b. This insertion device can insert data from the upward flowing stream into the downward flowing stream. A similar circuit, identical in content, but flipped so as to work on the other data paths could be used to insert data from the downward stream into the upward stream. No such circuit is illustrated here, but those familiar with the art will be able to understand how such a circuit would work from the following description.

The insertion circuit data path 124b contains an extra register 140 to hold the new data element that is to be inserted into the downward flowing data stream. This register receives from the upward bound data register 60 the data elements that are to be inserted into the downward bound data stream. The insertion circuit also contains a multiplexor 141 that will select either this new data or the regular data that is coming down from above along the downward flowing data path 36.

In the control mechanism described here, upward flow of data is delayed in the insertion unit 124 until insertion of the data element into the downward flowing stream is complete. Only after the new insertion into the downward stream is the data that is flowing up passed on to the stage above. It may be possible to devise an insertion device that will concurrently pass new data down and permit the upward flowing data to move on.

The control circuit 124a for the insertion device consists of two parts; the SELECTOR 142 and the XOR 144 form one part and the "Priority Blender" 148 the other part. The SELECTOR 142 event input comes from the AU! signal coming from below. This signal indicates that valid data are coming from below. Whether or not some of this data are to be inserted in to the downward stream is indicated to the SELECTOR by the presence of a true of false G signal on its data input 143. If data are not to be inserted, the insertion device 142 takes no action. In this case the selector delivers the event coming up from below on the AU! control path to the AU! control output path via the XOR element 144. Similarly, the CD input coming from above is delivered to the lower CD control output by the XOR unit 149. Similarly, the Priority Blender 148 will serve to provide a direct connection between events on its PD! and PD? inputs to its corresponding PD! and PD? outputs.

Let us now consider what happens when the signal G coming into the SELECTOR data input 143 indicates that insertion is to take place. An event arriving from the AU! input to the SELECTOR will be delivered to its "1" output. This will deliver an event to the PG? input of the priority blender, and via the XOR unit 146 will switch the MULTIPLEXOR 141 so as to deliver the data to be inserted from register 140 onto the output data path 36. After a suitable delay to permit the data path to complete its setup, the delay element 145 will deliver its output to the XOR 149, thus producing an output on the CD output path at the bottom of the figure.

The job of the Priority Blender is to generate suitable control signals for doing the insertion. Ordinarily it connects the PD? and PD! signals directly through as their placement at its right suggests. However, when activated by a PG? input, it produces a PD? output if one has not already been produced. It subsequently delivers the first PD! response to the PG! output rather than to the PD! output.

The stage below the insertion device cannot tell the difference between data inserted into the data stream by the insertion device and data delivered from the stage above. In either case the PD? and PD! signals are properly sequenced, as is the CD signal. Thus the data from register 140 delivered by the multiplexor 141 to the output data wires 36 are delivered to the stage below. When this action is complete, as has previously been stated, A PD! event will be received from below. The priority blender delivers this PD! event to its PG! output. Here it does two things. First, upon reaching the XOR device 146 it switches the MULTIPLEXOR 141 back to the through position. Second, via the XOR 144 it finally permits an event on the AU! output at the top of the figure to finally tell the stage above that upward bound data have arrived.

STATE DIAGRAM

When all of the elements of a stage are assembled together, a great many events can happen concurrently. In addition to the normal flow of data described by the five states of FIG. 3, many more states are made possible by the potential to delete or insert data into the streams. These states come about because data flowing up or down may be deleted and because new data may be inserted. The state diagram of FIG. 14 outlines one possible set of states that a single stage of a complete counterflow pipeline might experience.

Figure 14:
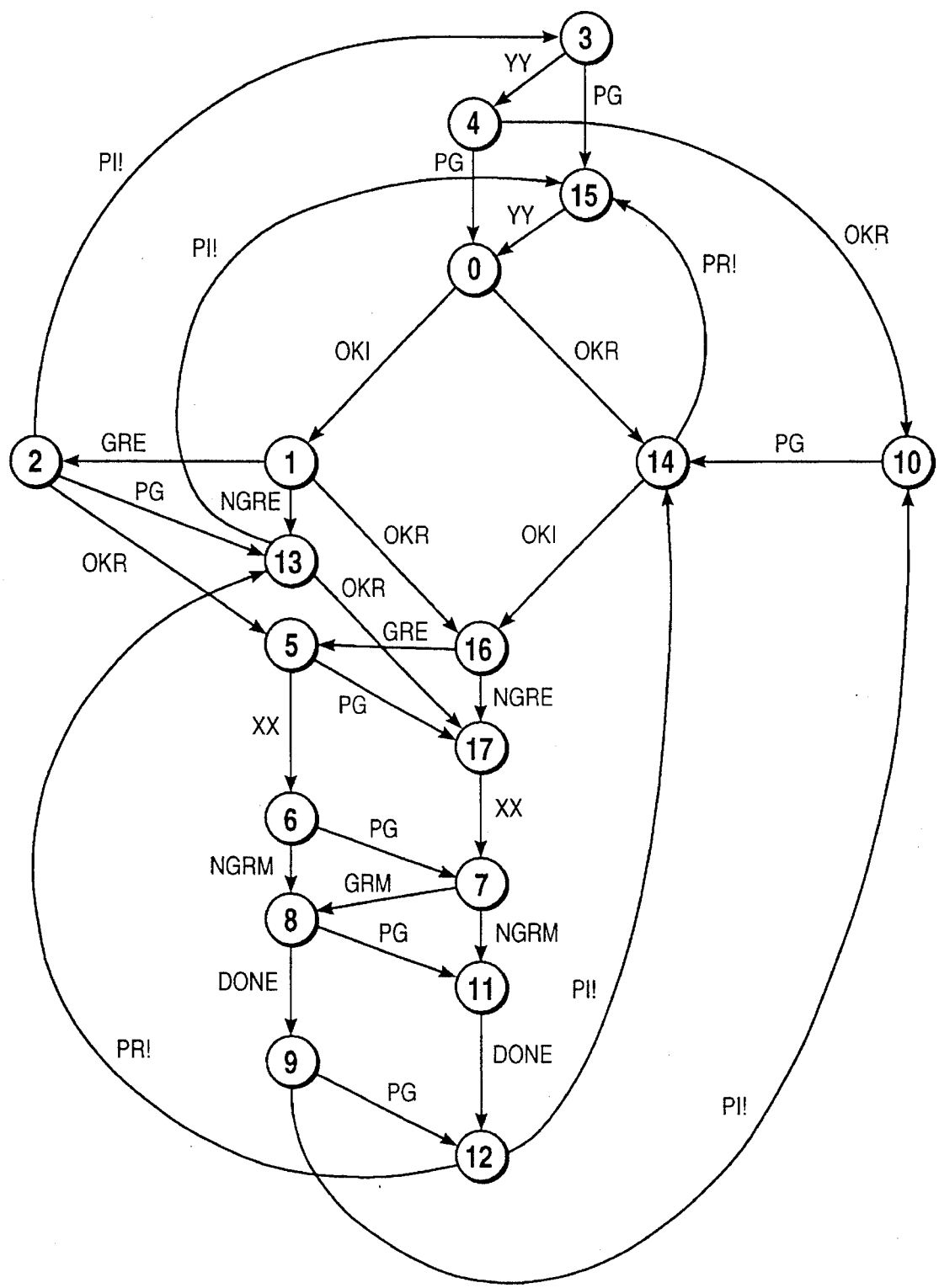
FIG. 14 is a state diagram for a single stage of one implementation of the counterflow pipeline showing events for insertion and deletion.

Notice, first, that the diagram of FIG. 14 has the general character of the diagram of FIG. 3, but that each of the states of FIG. 3 has been broken into a multiplicity of sub states. For example, the state (E) at the top of FIG. 3 appears in FIG. 14 to be broken into 4 states, numbers 0, 4, 3, and 15. In fact, the state diagram of FIG. 3 is a sub set of the state diagram of FIG. 14; were states in FIG. 14 suitably merged, the state diagram of FIG. 3 would emerge.

The state diagram of FIG. 14 is taken from a particular design of a particular pipeline system. In this figure, designations containing the character "1" refer to upward-bound data and designations containing the character "R" refer to downward bound data. The state diagram details the states involved in dealing with insertion of data from the upward bound stream into the downward bound stream. OKI and PI! refer to accepting and passing upward bound data, respectively. OKR and PR refer to accepting and passing downward bound data respectively. GRE refers to the need to insert a new downward bound data element as a result of an upward bound one where the need is known as soon as the upward bound element arrives. NGRE refers to the lack of such a need. GRM refers to discovering a need to insert a new downward bound data element as a result of comparing the upward bound and downward bound elements. NGRM refers to the lack of such a need. PG is the act of passing the newly generated element as a part of the downward stream. XX refers to detecting that both an upward and downward element are present, i.e., that the state (F) has been reached. YY refers to detecting that the stage is empty except, possibly, for a new element to be inserted into the downward flowing stream.

With these designations in mind, one can interpret the state diagram of FIG. 14. Notice that upon passing, PG, the newly generated element the outer ring of states, 2,3,4,5,6, 8,9,10 all lead into the inner ring of states. GRE, indicating that a new element must be generated in the downward stream can happen only when an upward flowing element is present. GRM, similarly, can happen only when both an upward and a downward flowing element is present.

The state diagram of FIG. 14 assumes certain rules of behavior for the insertion and deletion circuits of the system. Should other rules of behavior be required, a state diagram similar to but not identical with FIG. 14 could be drawn. Those familiar with the art will recognize that such state diagrams are commonly used to describe the behavior of complex systems such as the one described here.

The design of a synchronous control mechanism to implement the state diagram of FIG. 14 is straightforward. Those skilled in the art will recognize that any of a number of state encodings is possible. For example, the state might be encoded by the two marker bits 62 and 64 from FIG. 2A, a bit to indicate the presence of a generated result, a bit to indicate that the upward flowing data element now present has already generated a new downward flowing element and therefore will not generate another, and finally a bit to indicate that the comparison operation is finished. The design of such a synchronous control is well within the state of the art.

The design of an asynchronous control is not nearly so easy, however. In FIG. 10 it is shown how to break a single stage into constituent pans that do the different operations separately. Other designs are, of course, possible. It is not our intention here, by illustrating a particular design, to limit implementations to that single design. Rather, we point out that any of a number of designs that provide the required complete and non-redundant comparison may be used.

We claim:

1. A counterflowing data processing system capable of carrying distinct data elements in two directions, comprising:

a set of stages interconnected to form a pipeline;

circuitry configured to control the flow of a first group of distinct data elements in a first direction through the set of stages forming the pipeline;

circuitry configured to control the flow of a second group of distinct data elements in a second direction through the set of stages forming the pipeline;

one stage among the set of stages further including:

a dynamic selection circuit configured to determine if a first data element from the first group of distinct data elements and a second data element from the second group of distinct data elements are present at the one stage; and interaction circuitry configured to cause the first data element and the second data element to interact in the one stage when the first data element and the second data element are present in the one stage.

2. The system as set forth in claim 1, further comprising circuitry for assuring that the first data element interacts with each of the distinct data elements of the second group encountered in the pipeline no more than once.

3. The system as set forth in claim 1, wherein the interaction circuitry comprises compare circuitry to compare the first data element in the one stage with each of the distinct data elements of the second group of data elements encountered in the one stage.

4. The system as set forth in claim 3, wherein the interaction circuitry further comprises prevention circuitry to prevent the flow of the first data element and the flow of the second data element in the one stage, until the compare circuitry has completed its comparison of the first data element and the second data element.

5. The system as set forth in claim 1, wherein the dynamic selection circuit further comprises state determination circuitry to determine the state of the one stage, the one stage capable of occupying any one of the following states: Empty; Full; Up; Down; and Complete.

6. The system of claim 5, wherein the state of the one stage is changed according to the order of crossing boundaries defining the one stage by the first data element and the second data element.

7. The system as set forth in claim 1, wherein the one stage comprises memory elements to retain the first data element and the second data element.

8. The system as set forth in claim 1, wherein the one stage comprises modifying circuitry to modify the first and/or second distinct data elements.

9. The system of claim 8, wherein the one stage includes circuitry to insert a portion of the first data element flowing in the first direction as one of the distinct data elements of the second group flowing in the second direction.

10. The system as set forth in claim 8, wherein the modifying circuitry comprises circuitry to delete the second data element from the pipeline.

11. The system as set forth in claim 8, wherein the modifying circuitry comprises circuitry to perform computations involving the first data element in the pipeline.

12. The system as set forth in claim 11, wherein the circuitry to perform computations permits different computations to be made at different ones of the set of stages interconnected to form the pipeline.

13. The system as set forth in claim 11, wherein the circuitry to perform computations permits the same computations to be made at different ones of the set of stages interconnected to form the pipeline.

14. The system as set forth in claim 8, wherein the modifying circuitry comprises circuitry to update the second data element.

15. The system as set forth in claim 1, wherein the circuitry to control the flow of the first group of distinct data elements and the circuitry to control the flow of the second group of distinct data elements permits elastic operation of the pipeline.

16. The system as set forth in claim 1, wherein the circuitry to control the flow of the first group of distinct data elements and the circuitry to control the flow of the second group of distinct data elements further comprises circuitry for bi-directional communication between the stages.

17. The system as set forth in claim 1, wherein the circuitry to control the flow of the first group of distinct data elements and the circuitry to control the flow of the second group of distinct data elements permits asycnchronous movement of the first group and the second group of distinct data elements in the pipeline.

18. The system as set forth in claim 1, wherein the circuitry to control the flow of the first group of distinct data elements and the circuitry to control the flow of the second group of distinct data elements permits synchronous movement of the first group and the second group of distinct data elements in the pipeline.

19. The system as set forth in claim 1, wherein the circuitry to control the flow of the first group of distinct data elements and the circuitry to control the flow of the second group of distinct data elements is included in the set of stages interconnected to form the pipeline.

20. The system as set forth in claim 1, wherein the pipeline further comprises circuitry configured to provide external signals to at least some of the stages of the pipeline.

21. The system as set forth in claim 1, wherein the pipeline further comprises:
circuitry configured to form branches in the pipeline; and
circuitry to control the flow of selected ones of the distinct data elements into and out of the branches.

22. The system as set forth in claim 1, wherein the pipeline further comprises: circuitry configured to form sidings to the pipeline; and
circuitry to control the flow of selected ones of the data elements into and out of the sidings.

23. The system as set forth in claim 1 further comprising a set of the dynamic selection circuits and a set of the interaction circuits, each one of the dynamic selection circuits and the interaction circuits associated with one of the set of stages in the pipeline respectively.

24. The system of claim 1, further comprising circuitry distributed among the set of stages to ensure that each of the distinct data elements of the first group is compared with each of the distinct data elements of the second group in the pipeline.

25. The system of claim 1, wherein the dynamic selection circuit is used to determine at which stage in the pipeline a particular first data element from the first group will interact with a particular second data element from the second group.

26. A method of providing a data processing system capable of carrying distinct data elements in two directions, comprising the steps of:
providing a set of stages interconnected to form a pipeline;
providing circuitry configured to control the flow of a first group of distinct data elements in a first direction through the set of stages forming the pipeline; and
providing circuitry configured to control the flow of a second group of distinct data elements in a second direction through the set of stages forming the pipeline;
providing one stage among the set of stages further including:
a dynamic selection circuit configured to determine if a first data element from the first group of distinct data elements and a second data element from the second group of distinct data elements are present at the one stage; and
interaction circuitry configured to cause the first data element and the second data element to interact in the one stage when both the first data element and the second data element are present in the one stage.

27. A method of managing a data processing system capable of carrying distinct data elements in two directions, comprising the steps of:
controlling the flow of a first group of distinct data elements in a first direction through a set of stages forming a pipeline;

controlling the flow of a second group of distinct data elements in a second direction through the set of stages forming the pipeline;

dynamically selecting one stage among the set of stages in the pipeline, the one stage selected by determining when a first data element from the first group of distinct data elements and a second data element from the second group of distinct data elements are present at the one stage; and causing the first data element and the second data element to interact in the one stage when the first data element and the second data element are present in the one stage.

28. The method as set forth in claim 27, further comprising the step of assuring that the first data element interacts with each of the distinct data elements of the second group encountered in the pipeline no more than once.

29. The method as set forth in claim 27, wherein the dynamic selecting step further comprises the step of determining the state of the one stage, the one stage capable of occupying any one of the following states: Empty; Full; Up; Down; and Complete.

30. The method of claim 27, wherein the steps of controlling the flow of the first group of distinct data elements and the flow of the second group of distinct data elements permits elastic operation of the pipeline.

31. The method as set forth in claim 27, further comprising the step of modifying the first data element and/or the second data element.

32. The method as set forth in claim 31, wherein the modifying step further comprises the step of deleting the second data element from the pipeline.

33. The method as set forth in claim 31, wherein the modifying step further comprises the step of performing computations involving the first data element.

34. The method as set forth in claim 31 wherein the modifying step further comprises the step of updating the second data element.

35. The method of claim 31, further comprising the step of inserting a portion of the first data element flowing in the first direction as one of the distinct data elements of the second group flowing in the second direction.

36. The method of claim 27, wherein the interaction step further comprises the step of comparing the first data element in the one stage with each of the distinct data elements of the second group encountered in the one stage.

37. The method of claim 36, further comprising the step of preventing the movement of the first data element from the selected stage until the comparing step has been completed.

38. The method of claim 27, wherein the step of controlling the flow of the first group of distinct data elements and the step of controlling the flow of the second group of distinct data elements further comprises the step of permitting asynchronous movement of the data elements of the first group and the second group in the pipeline.

39. The method of claim 27, wherein the step of controlling the flow of the first group of distinct data elements and the step of controlling the flow of the second group of distinct data elements further comprises the step of permitting synchronous movement of the data elements of the first group and the second group in the pipeline.

* * * * *